(12) United States Patent
Renke et al.

(10) Patent No.: US 10,147,079 B2
(45) Date of Patent: Dec. 4, 2018

(54) OPEN TICKET PAYMENT HANDLING WITH OFFLINE MODE

(71) Applicant: Square, Inc., San Francisco, CA (US)

(72) Inventors: Christopher Philip Renke, San Francisco, CA (US); Michael Wells White, San Francisco, CA (US); Eric Dickeson Muller, San Francisco, CA (US); Mathew Wilson, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/686,381

(22) Filed: Apr. 14, 2015

(65) Prior Publication Data

US 2016/0307176 A1    Oct. 20, 2016

(51) Int. Cl.
*G06Q 20/00*    (2012.01)
*G06Q 20/20*    (2012.01)
*G06Q 30/06*    (2012.01)

(52) U.S. Cl.
CPC ........... *G06Q 20/202* (2013.01); *G06Q 20/20* (2013.01); *G06Q 30/0635* (2013.01)

(58) Field of Classification Search
CPC ............................ G06Q 20/20; G06Q 20/202
See application file for complete search history.

(56) References Cited

U.S. PATENT DOCUMENTS

| | | | |
|---|---|---|---|
| 5,664,110 A * | 9/1997 | Green et al. | 705/27.2 |
| 7,117,183 B2 | 10/2006 | Blair et al. | |
| 7,257,547 B1 * | 8/2007 | Terase | 705/15 |
| 7,835,990 B2 | 11/2010 | Coleman | |
| 8,028,896 B2 | 10/2011 | Carter et al. | |
| 8,370,207 B2 | 2/2013 | Edwards | |
| 8,498,900 B1 * | 7/2013 | Spirin et al. | 705/15 |
| 8,769,304 B2 | 7/2014 | Kirsch | |
| 8,831,677 B2 | 9/2014 | Villa-Real | |
| 9,218,413 B2 | 12/2015 | Skeen et al. | |
| 9,569,757 B1 | 2/2017 | Wilson et al. | |
| 9,674,669 B2 | 6/2017 | Subramanian et al. | |
| 9,807,086 B2 | 10/2017 | Nordstrom et al. | |
| 2002/0092912 A1 * | 7/2002 | Hamilton et al. | 235/462.46 |
| 2003/0046166 A1 | 3/2003 | Liebman | |
| 2003/0050854 A1 | 3/2003 | Showghi et al. | |

(Continued)

FOREIGN PATENT DOCUMENTS

WO    2016/168298 A2    10/2016
WO    2017/116610 A1    7/2017

OTHER PUBLICATIONS

Non-Final Office Action dated Dec. 17, 2015, for U.S. Appl. No. 14/871,776 of Wilson, M., et al., filed Sep. 30, 2015.

(Continued)

*Primary Examiner* — Ramsey Refai
(74) *Attorney, Agent, or Firm* — Lee & Hayes, PC

(57) ABSTRACT

A payment handling system may operate to handle payments for the cost of a transaction in which one or more devices operate in an offline mode. The payment handling system may allow for merchant devices to make modifications to local versions of an open ticket while in an off-line mode. When a merchant device subsequently enters an online mode, the systems and techniques may operate to reconcile differences between the local versions of the open ticket.

18 Claims, 9 Drawing Sheets

(56) References Cited

U.S. PATENT DOCUMENTS

| | | | |
|---|---|---|---|
| 2004/0054592 A1* | 3/2004 | Hernblad | 705/15 |
| 2004/0143512 A1* | 7/2004 | Sturr, Jr. | 705/26 |
| 2005/0071232 A1 | 3/2005 | Frater | |
| 2005/0108116 A1 | 5/2005 | Dobson et al. | |
| 2006/0255128 A1* | 11/2006 | Johnson et al. | 235/380 |
| 2009/0037286 A1 | 2/2009 | Foster | |
| 2012/0166332 A1 | 6/2012 | Naaman | |
| 2012/0173396 A1 | 7/2012 | Melby et al. | |
| 2013/0204718 A1 | 8/2013 | Freeman | |
| 2014/0164234 A1 | 6/2014 | Coffman et al. | |
| 2014/0279098 A1 | 9/2014 | Ham | |
| 2014/0330654 A1 | 11/2014 | Turney et al. | |
| 2014/0365286 A1 | 12/2014 | Samoville | |
| 2015/0039450 A1* | 2/2015 | Hernblad | 705/15 |
| 2015/0120344 A1 | 4/2015 | Rose | |
| 2015/0134441 A1* | 5/2015 | Balar et al. | 705/14.38 |
| 2015/0235254 A1 | 8/2015 | Carroll-Boser et al. | |
| 2015/0310408 A1 | 10/2015 | Anderson | |
| 2015/0324937 A1 | 11/2015 | Callahan | |
| 2016/0267448 A1 | 9/2016 | James et al. | |
| 2017/0193470 A1 | 7/2017 | Renke et al. | |
| 2017/0193488 A1 | 7/2017 | Renke et al. | |

OTHER PUBLICATIONS

International Search Report and Written Opinion for International Application No. PCT/US2016/027288, dated Sep. 30, 2016.
Final Office Action mailed Nov. 29, 2016, for U.S. Appl. No. 14/985,528, of Renke, C.P., et al., filed Dec. 31, 2015.
Non-Final Office Action dated Jun. 12, 2017, for U.S. Appl. No. 15/253,172, of Wilson, M., et al., filed Aug. 31, 2016.
International Search Report and Written Opinion for International Patent Application No. PCT/US2016/064710, dated May 11, 2017.
Notice of Allowance dated Jun. 29, 2016, for U.S. Appl. No. 14/871,776, of Wilson, M., et al., filed Sep. 30, 2015.
Non-Final Office Action dated May 9, 2016, for U.S. Appl. No. 14/985,528, of Renke, C.P., et al., filed Dec. 31, 2015.
Non-Final Office Action dated Aug. 11, 2017, for U.S. Appl. No. 14/985,528, of Renke, C.P., et al., filed Dec. 31, 2015.
Final Office Action dated Feb. 22, 2018, for U.S. Appl. No. 14/985,528, of Renke, C.P., et al., filed Dec. 31, 2015.
Notice of Allowance dated Dec. 1, 2017, for U.S. Appl. No. 15/253,172, of Wilson, M., et al., filed Aug. 31, 2016.
Non-Final Office Action dated Jan. 17, 2018, for U.S. Appl. No. 14/871,714, of Wilson, M., et al., filed Sep. 30, 2015.

* cited by examiner

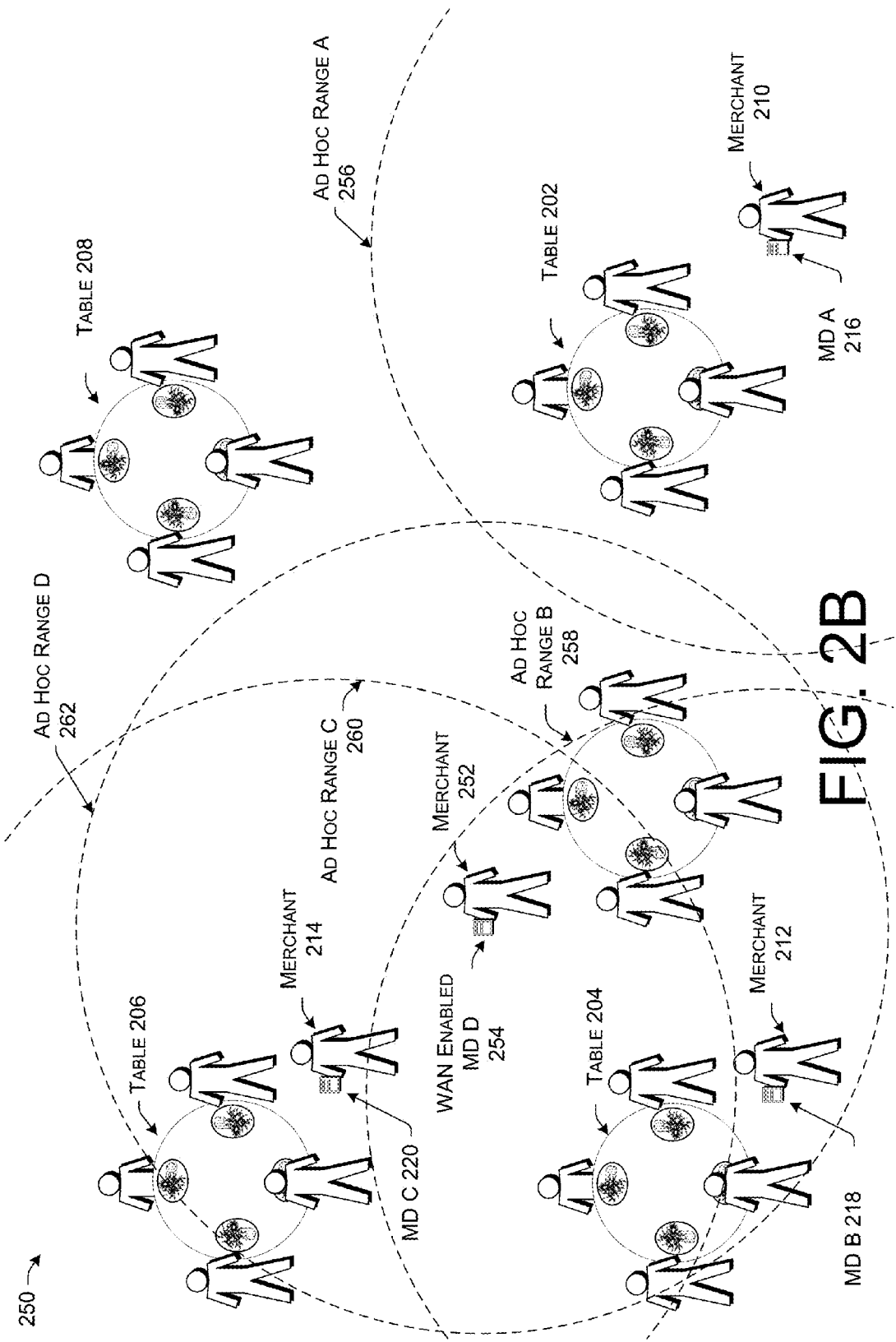

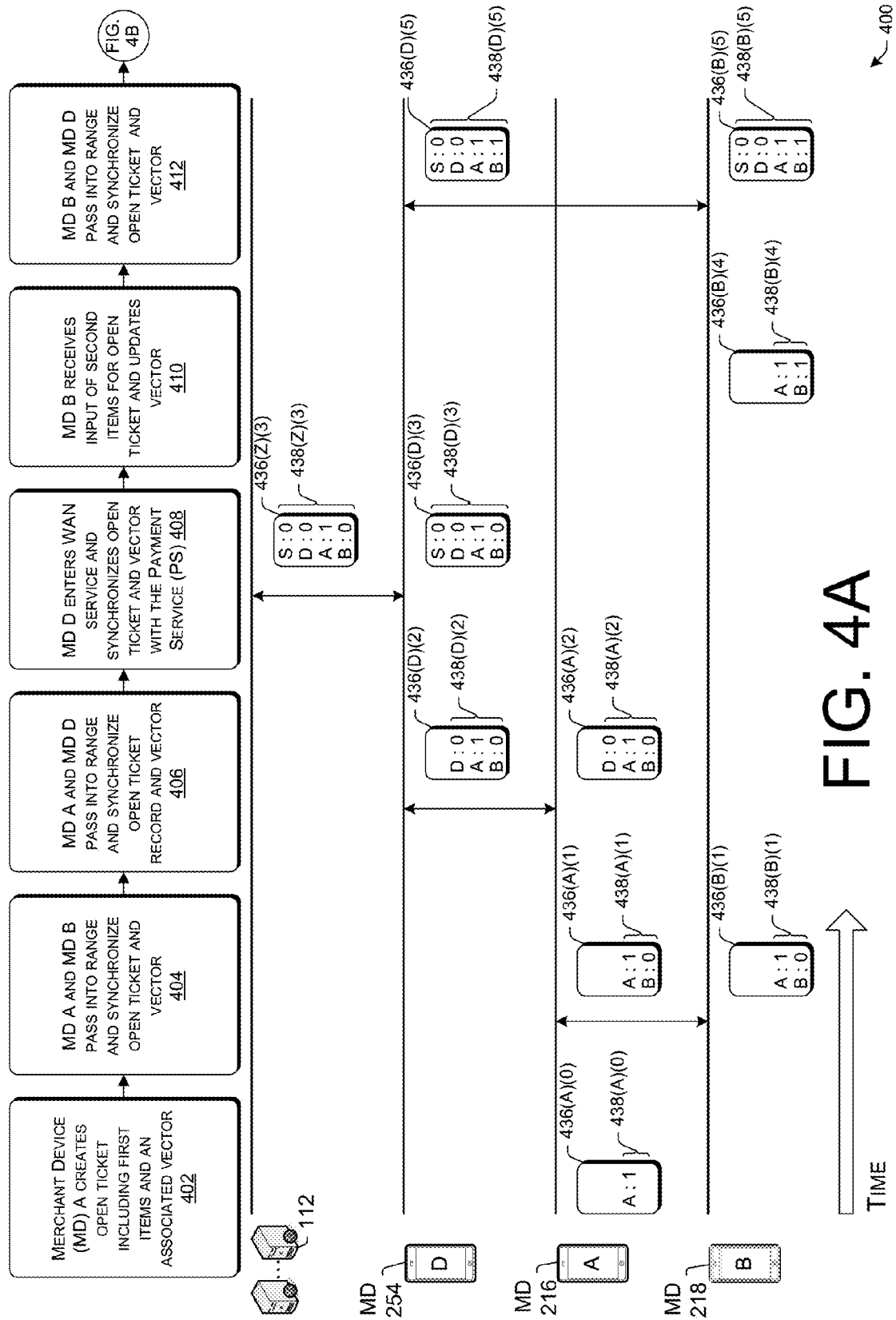

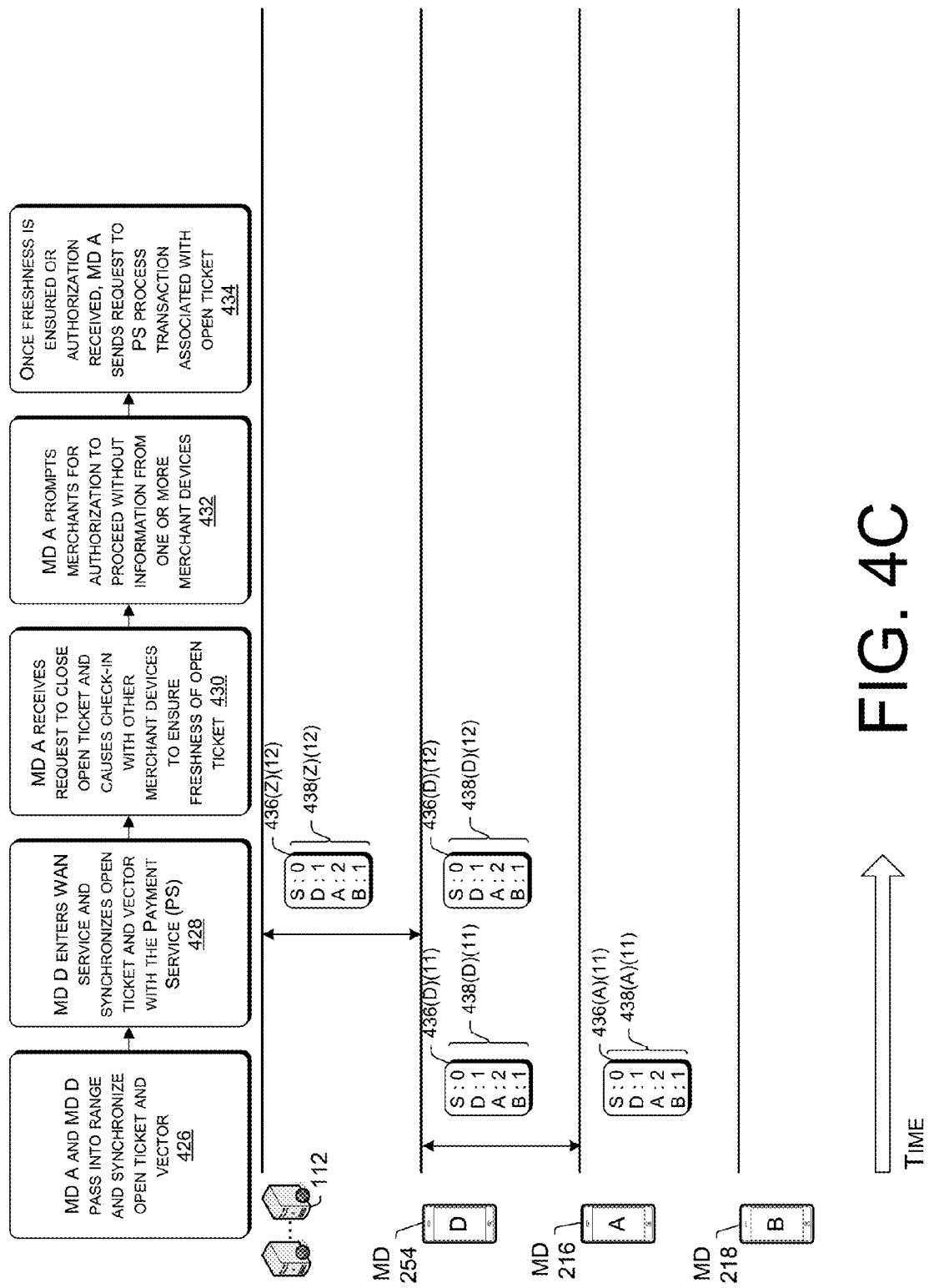

OPEN TICKET PAYMENT HANDLING WITH OFFLINE MODE

BACKGROUND

In today's commerce, merchants often utilize an array of different point-of-sale (POS) devices, including mobile POS devices. Merchants may use these mobile POS devices to engage in transactions with customers at different locations. For instance, a waiter of a restaurant may use a mobile POS device to take and process customers' orders for food and drinks. In another example, a bartender may use a mobile POS device to charge a customer for items purchased over the course of a visit by the customer.

In some instances, the customers may wish to request items from the merchant over the span of a visit without paying multiple times. In such instances, the ticket for the transaction may be maintained and updated each time the customers request additional items. However, some customers may request additional items from a different waiter if the original waiter is not present. Such an occurrence may result in issues that may cause errors, delay, inconvenience, poor customer experience and loss of revenue. For example, requesting items from the different waiter may result in items being left off of the final ticket (e.g. the different waiter forgets to have the original waiter update the ticket), duplicate items may be delivered to the customer or the customer may be double charged an item, the customers may not receive the additional items requested from the different waiter (e.g. the different waiter becomes distracted by other customers and forgets to the cause the update to the ticket) and so on.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIGS. 2A-2B are example illustrations of two scenarios that provide context for FIGS. 3A-4C.

FIGS. 4A-4C are sequence diagrams illustrating the operations of the offline mode functionality executed by the system shown in FIG. 1 in the context of FIG. 2B.

DETAILED DESCRIPTION

Figure 1:
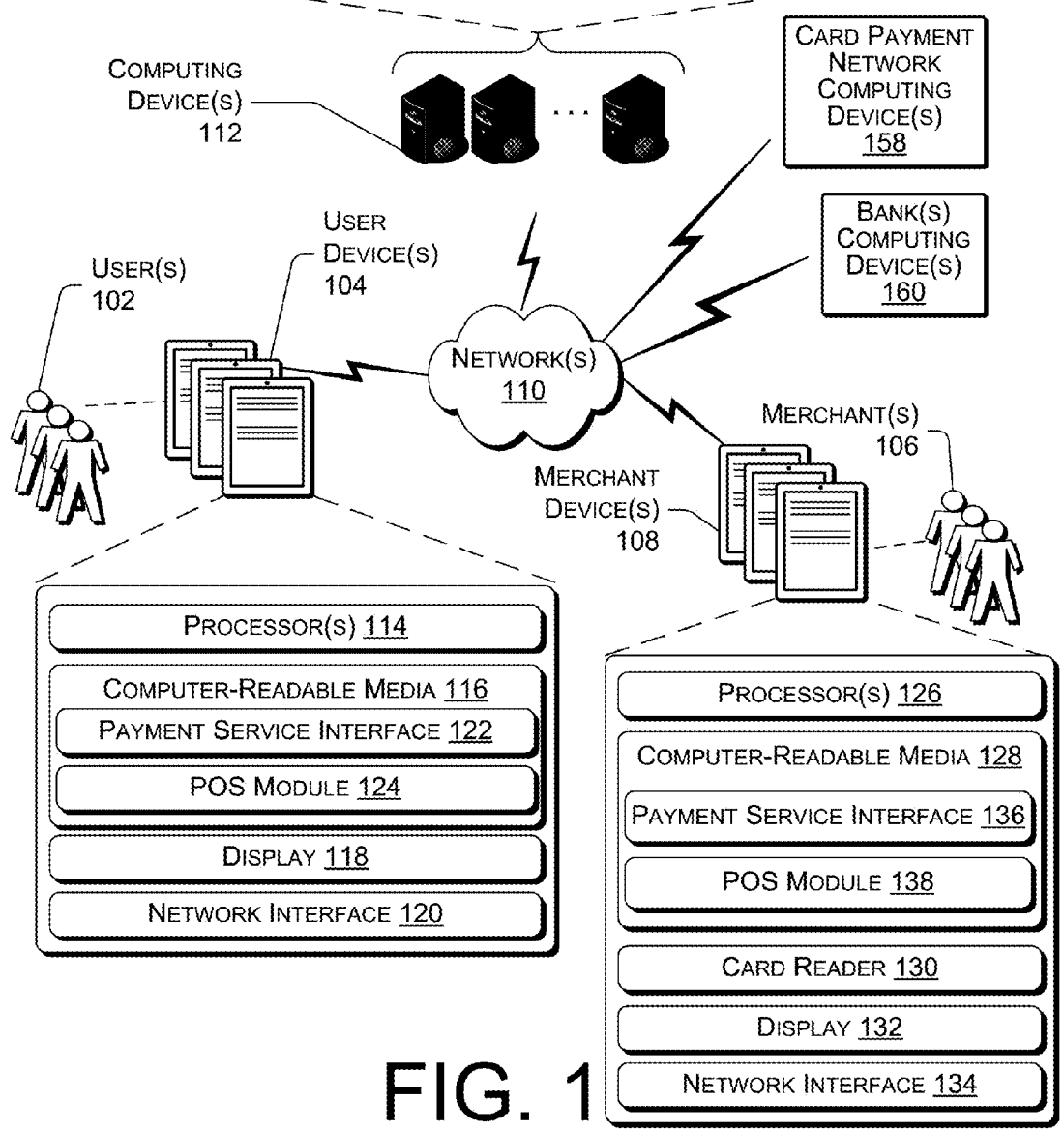
FIG. 1 illustrates an example system for handling payments among customers and merchants.

This disclosure describes systems and processes that provide for operation of merchant devices in an off-line mode when handling payments among customers and merchants for open tickets. In some examples herein, the systems and techniques may provide for merchant devices to make modifications to local versions of an open ticket while in an off-line mode. When the merchant device subsequently enters an online mode, the systems and techniques may resolve differences between the versions of the open ticket. The functionality for providing off-line mode operation when handling payments may be implemented in a variety of ways, examples of which are discussed below.

In an example implementation utilized by a restaurant, a waiter of the restaurant may input a request to a merchant device to create an open ticket for a transaction with customers at a table. The merchant device may create the open ticket or request that a payment service create the open ticket. After the ticket is created, the merchant may input information for the transaction with the customers. For example, the waiter may enter initial food items requested by the customers and/or one or payment instruments to be associated with the open ticket. Subsequently, copies of the open ticket are distributed to other merchant devices in the restaurant. Depending on the implementation, the distribution of the open ticket among the other merchant devices may be performed via a payment service and/or by peer-to-peer communications (e.g. using a local area network (LAN) or an ad hoc network).

When a request for additional items is entered into one of the merchant devices or other changes are made to the open ticket by one of the merchant devices, the changes may be propagated and reconciled among the local versions of the open ticket. However, when a change is made to a local version of a merchant device in an off-line mode, the changes may not be propagated until after changes are made to other local versions. Similarly, an offline device may not receive changes to an open ticket made by other devices. As a result, when the device enters an online mode, the system may reconcile the changes to ascertain an actual state of the open ticket transaction. Example ways in which such reconciliation may be performed are provided below with regard to FIGS. 3A-5.

Throughout this disclosure, reference is made to devices operating in online mode and offline mode. Whether a device is considered to be in an offline mode or an online mode may vary depending on the implementation. In some examples, offline mode refers to a mode in which a device is unable to connect to or communicate with at least one other device (e.g. offline with respect to the other device with which the device is not connected or able to communicate). In some examples, the offline mode may be total or selective. Some examples of a device in an offline mode are a device which is out of range of a radio base station, a device that is unplugged from a hardline network, a device that has been intentionally put into an offline or "airplane" mode, a device that is part of an ad-hoc network that is experiencing a temporary network partition through a connectivity issue of another device in the ad-hoc network, and so on. In some examples, a device is in an online mode when it is able to communicate or connect with at least one other device. Similarly to an offline mode, the online mode may be total or selective. Some examples of a device being in an online mode include a device that can communicate with another device in an ad hoc or peer-to-peer network, a device that can communicate with at least some devices in an LAN, a device that can communicate with all devices in a LAN, and/or a device that can communicate with a payment service system, and so on.

At the end of the open ticket transaction (i.e. the customers leave or indicate they are ready to leave), the waiter may input a close ticket request. In response, the system may perform a final reconciliation of the local versions and execute the payment transaction.

Additional details and scenarios are described below. This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many. For example, though discussed herein in the context of a payment handling system, implementations are not so limited.

FIG. 1 illustrates an example system 100 for handling open ticket transactions among customers and merchants. More particularly, FIG. 1 provides a framework for providing functionality for offline mode operations. Additional details of offline mode operations are provided with respect to FIGS. 2A-5.

As shown in FIG. 1, the system 100 may include one or more user(s) 102 (e.g. customers), one or more user device(s) 104 associated with the user(s) 102, one or more merchants 106, one or more merchant devices 108 associated with the one or more merchants 106, one or more network(s) 110, and one or more computing device(s) 112. In various implementations, the user(s) 102 may operate the user device(s) 104, which may include one or more processor(s) 114, computer-readable media 116, a display 118 and a network interface 120. The computer-readable media may store a payment service interface 122 and a POS module 124. Similarly, the merchant(s) 106 may operate the merchant device(s) 108, which may include one or more processor(s) 126, computer-readable media 128, a card reader 130, a display 132 and a network interface 134. The computer-readable media 126 may store a payment service interface 136 and a POS module 138. The computing device(s) 112 may also include one or more processor(s) 140, computer-readable media 142 and a network interface 144. The computer readable media 142 may store a user interaction module 146, a merchant interaction module 148, a payment module 150 and a database 152.

In some implementations, one of the users 102 may operate a user device 104 to perform various functions associated with the user device 104. For example, a user of the user(s) 102 may utilize the user device 104, and particularly the payment service interface 122 thereof, to interact with the computing devices 112 via the network interface 120 to establish a user account with the payment service of the computing devices 112. In addition, a user of the user(s) 102 may utilize POS module 124 of the user device 104 to interface with the POS module 138 of the merchant device(s) 108, e.g. as part of a transaction using the payment service of the computing devices 112. For example, the user device 104 may communicate via the network interface 120 with the merchant device(s) 108 and the network interface 134. As an example of such a payment operation, the POS module 138 of the merchant device 108 may communicate with the POS module 124 of the user device 104 to obtain information for processing a payment from the user 102 to the merchant 106 using the payment service of the computing devices 112.

In some implementations, the user device 104 may be any type of device that is capable of interacting with the merchant device(s) 108 and/or the computing device(s) 112. For instance, the user device 104 may include a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules, such as a module for a user dashboard to enable the user to control information in a user's profile, set user preferences, and so forth.

The processor(s) 114 of the user device 104 may execute one or more modules and/or processes to cause the user device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the user device 104, the computer-readable media 116 may include volatile memory (such as RAM), non-volatile memory (such as ROM, flash memory, miniature hard drive, memory card, or the like), or some combination thereof.

In various implementations, the user device 104 may also have input device(s) such as a keyboard, a mouse, a pen, a voice input device, a touch input device, etc. The user device 104 may also include the display 118 and other output device(s), such as speakers, a printer, etc. The user 102 may utilize the foregoing features to interact with the user device 104, merchant device(s) 108 or the computing device(s) 112 via the network(s) 110. More particularly, the display 118 of the user device 104 may include any type of display 118 known in the art that is configured to present (e.g., display) information to the users 102.

In various implementations, the one or more merchants 106 may be any individual, entity, or machine that offers products, services or the like according to the examples herein. Moreover, each of the merchants 106 may be associated with one or more merchant devices 108, which may be the same as, similar to, or different from the user devices 104. The merchant devices 108 may include any number of components such as the one or more processor(s) 126, the computer-readable media 128, the card reader 130, the display 132 and/or network interface 134. The merchants 106 may utilize the merchant devices 108 to interact with the user device(s) 104 and/or computing device(s) 112 in any manner. For instance, the merchant devices 108 may be used to access an interface associated with the computing device(s) 112 (e.g. the payment service interface 136). Continuing the above example, a merchant device 108 may utilize information obtained from interacting with the POS module 124 of the user device 104 to execute the payment from the user 102 to the merchant 106 through the payment service of the computing devices 112. Further, the POS module 138 may control the operation of the card reader 130 to read payment information from credit cards, debit cards, gift cards and the like. The POS module 138 may then utilize the information in operations for allocating portions of a transaction cost between a plurality of payment instruments. Moreover, the POS module 138 may operate to interact with the card payment network computing devices(s) 160 and/or bank(s) computing device(s) 160 to execute payments from the user 102 to the merchant 106.

While the user devices 104 and merchant devices 108 are shown as including different modules, this is merely for ease of illustration and not intended as limiting. In various implementations, the user devices 104 and merchant devices 108 may be identical, similar or distinct. Moreover, the modules shown and described for the user devices 104 and merchant devices 108 may be implemented as more modules or as fewer modules and functions described for the modules may be redistributed depending on the details of the implementation. Further, in some implementations, the user devices 104 and/or merchant devices 108 may vary from device to device. In general, the user devices 104 and the merchant devices 108 can each be any appropriate device operable to send and receive requests, messages, or other types of information over the one or more networks 110 or directly to each other. Additionally, in some implementation, there may be thousands, hundreds of thousands, or more, of the user devices 104 and the merchant devices 108.

In some implementations, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the user devices 104, the merchant devices 108, and the computing device(s) 112 may communicatively couple to the network(s) 110 in any manner, such as by a wired or wireless connection. The network(s) 110 may also facilitate communication between the user devices 104, the merchant devices 108, and the computing device(s) 112. In turn, the network interfaces 120, 134 and 144 of the user devices 104, the merchant devices 108, and the computing device(s) 112 may be any network interface hardware components that may allow user devices 104, the merchant devices 108, and the computing device(s) 112 communicate over the network(s) 110. For example, in a particular implementation, the network interfaces 120 and 134 of the user devices 104 and merchant devices 108 may include near field communication capabilities for performing the communications there between involved in POS operations.

In addition, and as mentioned previously, the computing device(s) 112 may include the one or more processor(s) 140, the computer-readable media 142 and network interface 144. The computing device(s) 112 may also include additional components not listed above that may perform any function associated with the computing device(s) 112. In various implementations, the computing device(s) 112 may be any type of computing device, such as a network-accessible server, and may be one of multiple servers included in a server cluster or server farm. In other implementations, the processor(s) 140 and the computer-readable media 142 of the computing device(s) 112 may be the same as, similar to, or different from the processor(s) 114 and the computer-readable media 116, respectively, of the user device(s) 104. As discussed above, the computer-readable media 142 may store the user interaction module 146, the merchant interaction module 148, the payment module 150 and the database 152. The database 152 may store various information including user account information 154 and merchant information 158.

The user interaction module 146 and merchant interaction module 148 operate to interface with the user devices 104 and merchant devices 108, respectively. For example, the modules 146 and 148 may operate in accordance with instructions from the payment module 150 to request or provide information on behalf of the payment module 150. The payment module 150 may handle the processing of payments. For example, the payment module 150 may utilize the user interaction module 146 and the merchant interaction module 148 to handle communication with the user 102 and merchant 106, respectively. In addition, the payment module 150 may utilize information from the database 152, such as the user account information 154 and merchant information 158 to provide handling of payments between merchants and users. In some implementations, user account information 154 may include information regarding electronic payment accounts of the customers (e.g. users 102).

As mentioned above, the payment module 150 may handle payments between merchants and users. When paying for a transaction, a user 102 can provide the amount of payment that is due to a merchant 106 using cash, check, a payment card, NFC, or by electronic payment through a payment service of the computing devices 112. The merchant 106 can interact with the merchant device 108 to process the transaction. In some examples, the service of the computing devise 112 may handle some payments while other payments may at least at times be handled by point of sale (POS) transactions. In such cases, the point of sale may be the place where the user 102 with user device 104 interacts with the merchant 106 with merchant device 108 and executes a transaction (e.g. purchases items from a street vendor merchant or a restaurant merchant). During point-of-sale (POS) transactions, the merchant device 108 can determine and send data describing the transactions, including, for example, services provided, item(s) being purchased, the amount of the services or item(s), buyer information, and so forth.

In some implementations, the payment service enables card-less payments, i.e., electronic payments, for transactions between the users 102 and the merchants 106 based on interaction of the user 102 with the user device 104 and interaction of the merchant 106 with the merchant device 108. Accordingly, in some examples, a card-less payment transaction may include a transaction conducted between a user 102 and a merchant 106 at a POS location during which an electronic payment account of the user 102 is charged without the user 102 having to physically present a payment card to the merchant 106 at the POS location. Consequently, the merchant 106 need not receive any details about the financial account of the user 102 for the transaction to be processed. As one example, the electronic payment may be charged to a credit card issuer or credit card number that the user 102 provided when signing up with the service of the computing devices 112 for an electronic payment account. As another example, the user 102 may have a quantity of money pre-paid in an account maintained for use in making the electronic payments. Other variations will also be apparent to those of skill in the art having the benefit of the disclosure herein.

Before conducting an electronic payment transaction, the user 102 typically creates a user account with the service of the computing devices 112. The user 102 can create the user account, for example, by interacting with an application of the user device 104 that is configured to perform electronic payment transactions and that may execute on the user device 104 (e.g. the payment service interface 122). When creating an electronic payment account with the service of the computing devices 112, the user 102 may provide an image including the face of the user, data describing a financial account of the user 102 (e.g., a credit card number, expiration date), and a billing address. This user information can be securely stored by the computing devices 112, for example, in the user account information 154 in the database 152. Further, the user account information 154 may be created for each user 102, which may include information about the user and transactions conducted by the user.

To accept electronic payments for POS transactions, the merchant 106 may create a merchant account with the service of the computing devices 112 by providing information describing the merchant including, for example, a merchant name, contact information, e.g., telephone numbers, the merchant's geographic location address, and one or more financial accounts to which funds collected from users will be deposited. This merchant information 156 can be securely stored by the service, for example, in the database 152 along with the user account information 154. Further, a merchant profile may be created for each merchant, which may include information about the merchant and transactions conducted by the merchant.

The service of the computing devices 112 may be configured to enable electronic payments for transactions. The computing devices 112 can include one or more servers that are configured to perform secure electronic financial transactions, e.g., electronic payments for transactions between a user and a merchant, for example, through data communicated between the user device 104 and the merchant device 108. Generally, when a user and a merchant enter into an electronic payment transaction, the transaction is processed by electronically transferring funds from a financial account associated with the user account to a financial account associated with the merchant account. Alternatively, the user may have a balance of funds maintained by the payment service as part of the user account which may be used in transactions.

The payment module 150 may be configured to send and receive data to and from the user device 104 and the merchant device 108. For example, the payment module 150 can be configured to send information describing merchants to an application on the user device 104 using, for example, the information stored in the database 152. For example, the payment module 150 can communicate data describing merchants 106 that are within a threshold geographic distance from a geographic location of the user device 104. The data describing the merchants 106 can include, for example, a merchant name, geographic location, contact information, and an electronic catalogue, e.g., a menu that describes items that are available from the merchant.

In some embodiments, the payment module 150 is configured to determine whether a geographic location of the user device 104 is within a threshold geographic distance from a geographic location of the merchant device 108. The payment module 150 can determine a geographic location of the user device 104 using, for example, geolocation data provided by the user device 104. Similarly, the payment module 150 can determine a geographic location of the merchant device 108 using, for example, geolocation data provided by the merchant device 108 or using a geographic address, e.g., street address, provided by the merchant. Depending on the implementation, the threshold geographic distance can be specified by the payment module 150, by the user, or by the merchant.

Determining whether the user device 104 is within a threshold geographic distance of the merchant device 108 can be accomplished in different ways including, for example, determining whether the user device 104 is within a threshold geographic radius of the merchant device 108, determining whether the user device 104 is within a particular geofence, or determining whether the user device 104 can communicate with the merchant device 108 using a specified wireless technology, e.g., Bluetooth® or Bluetooth® low energy (BLE). In some embodiments, the payment module 150 restricts electronic payment transactions between the user 102 and the merchant 106 to situations where the geographic location of the user device 104 is within a threshold geographic distance from a geographic location of the merchant device 108.

The computing devices 112 can also be configured to communicate with one or more computing devices 158 of a card payment network (e.g., MasterCard®, VISA®) over the one or more networks 110 to conduct financial transactions electronically. The computing devices 112 can also communicate with one or more bank computing devices 160 of one or more banks over the one or more networks 110. For example, the computing devices 112 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes. In addition, the merchant device(s) 108 may perform interactions similar to those described above with regard to the computing devices 158 of a card payment network and the bank computing devices 160 when processing transactions for payment instruments that do not involve the payment service of the computing devices 112.

The user 102 operating the user device 104 that is within a threshold geographic distance of the merchant device 108 can interact with an application executed on the user device 104 to conduct an electronic payment transaction with the merchant 106. While interacting with the application, the user 102 can select the merchant 106, from a listing of merchants 106, with whom the user wants to enter into an electronic payment transaction. The user 102 can select the merchant 106, for example, by selecting a "check in" option associated with the merchant 106. The user device 104 can communicate data to the computing devices 112 indicating that the user 102 has checked in with the merchant 106. In response, the computing devices 112 can communicate data to notify the merchant device 106 that the user has checked in. An application executing on the merchant device 108 can notify the merchant 106 that the user has electronically checked in with the merchant 106 through a display of the merchant device 108.

Once checked in, the user 102 can receive, obtain or request items, services or appointments that are available to be acquired from the merchant 106. When the user 102 is ready to enter into the card-less payment transaction, the user 102 can, for example, approach a point of sale for the merchant 106 and identify him or herself. For example, the user 102 can verbally notify the merchant 106 that the user 102 wants to enter into a card-less payment transaction and can provide the merchant 106 with the user's name. The merchant 106 can then interact with the application executing on the merchant's device to select the user 102, from a listing of users that have checked in with the merchant 106, to initiate an electronic payment transaction for the item(s) being acquired by the user 102. For example, the merchant 106 can determine a total amount to charge the user for the item(s) being acquired. The user can verbally approve the total amount to be paid and, in response, the merchant 106 can submit a request for an electronic payment transaction for the total amount of the transaction to the computing devices 112. In response, the computing devices 112 can obtain, for example, from the user account information 154, data describing a financial account associated with the electronic purchase account of the user 102 to which the total amount will be charged.

The computing devices 112 can then communicate with the computing device 158 of a card payment network to complete an electronic payment transaction for the total amount to be charged to user's electronic payment account. Once the electronic payment transaction is complete, the computing devices 112 can communicate data describing the electronic payment for the transaction to the user device 104, e.g., as an electronic receipt, which can, for example, notify the user 102 of the total amount charged to the user for the electronic payment for the transaction with the particular merchant. Further, while a mobile user device 104 is described in this example for purposes of explanation, additional or alternative types of devices may be used in other examples.

The payment module 150 of the computing devices 112 and the POS module 138 of the merchant devices 108 may include synchronization functionality for the open ticket data to enable the offline mode. In the examples discussed herein, the synchronization functionality is provided by using version vectors. In at least one example, one or more computer-readable media store instructions executable by one or more processors, wherein the instructions program the one or more processors to perform acts comprising: receiving, by a first point-of-sale (POS) device of a plurality of POS devices of a merchant, a first input of a first customer order associated with a transaction between the merchant and one or more customers, the first POS device configured with a cellular data connection and a WiFi connection; storing the first customer order as an open ticket with an associated versioning data structure in the memory of the first POS device; receiving, by a second POS device of the plurality of POS devices of the merchant from the first POS device while the first POS device and second POS device are within WiFi range of each other, a copy of the open ticket and a copy of the associated versioning data structure, the second POS device configured without a cellular data connection and with a WiFi connection; receiving, by the second POS device, a second input of a second customer order associated with the one or more customers while the first POS device and the second POS device are in an offline mode with respect to one another in which the first POS device and the second POS device are out of WiFi range of each other; updating, by the second POS device, the copy of the open ticket and associated versioning data structure based on the second input while the first POS device and second POS device are in the offline mode with respect to one another; receiving, by the first POS device from the second POS device, the updated copy of the open ticket and the updated copy of the associated versioning data structure when the first POS device and second POS device are in an online mode with respect to one another in which the first POS device and the second POS device are back in WiFi range and have reconnected; reconciling, by the first POS device, the open ticket with the updated copy of the open ticket based on the associated versioning data structure and the updated copy of the associated versioning data structure to generate a reconciled open ticket; receiving, by the payment service from the first POS device at least partly via the cellular data connection, the reconciled open ticket; receiving, by the payment service from the first POS device at least partly via the cellular data connection, a request to process payment for a cost of the transaction between the merchant and the one or more customers; and processing the payment for the cost of the transaction between the merchant and the one or more customers based on the reconciled open ticket. In at least one example, the instructions program the one or more processors to further perform acts comprising: receiving, by the first POS device, a third input of a third customer order associated the one or more customers prior to the first POS device and second POS device reconnecting; and updating, by the first POS device, the open ticket with the associated versioning data structure in the memory of the first POS device based on the third input, and wherein the reconciling comprises: determining one or more items of the third customer order match one or more of the items of the second customer order; requesting the merchant to provide fourth input regarding whether the one or more items of the third customer order are duplicate requests by the one or more customers for the one or more items of the second customer order; and generating the reconciled open ticket based on the fourth input received from the merchant. In at least one example, the instructions program the one or more processors to further perform acts comprising: receiving, by the first POS device, a third input of a third customer order associated the one or more customers prior to the first POS device and second POS device reconnecting; and updating, by the first POS device, the open ticket with the associated versioning data structure in the memory of the first POS device based on the third input, and wherein the reconciling comprises: determining one or more items of the third customer order do not match one or more items of the second customer order; generating the reconciled open ticket such that the reconciled open ticket includes at least the one or more items of the second order and the one or more items of the third order that do not match. In at least one example, the instructions program the one or more processors to further perform acts comprising: determining that the open ticket in the memory of the first POS device is an ancestor of the updated copy of the open ticket received from the second POS device based on the associated versioning data structure in the memory of the first POS device and the updated copy of the associated versioning data structure received from the second POS device; and wherein the reconciling is based at least the determination that the that the open ticket in the memory of the first POS device is an ancestor of the updated copy of the open ticket received from the second POS device. In at least one example, the instructions program the one or more processors to further perform acts comprising: receiving, by the first POS device, a third input of a third customer order associated the one or more customers prior to the first POS device and second POS device reconnecting; and updating, by the first POS device, the open ticket with the associated versioning data structure in the memory of the first POS device based on the third input, and determining that the open ticket in the memory of the first POS device and the updated copy of the open ticket received from the second POS device are concurrent versions based on the associated versioning data structure in the memory of the first POS device and the updated copy of the associated versioning data structure received from the second POS device; and wherein the reconciling is based at least the determination that the open ticket in the memory of the first POS device and the updated copy of the open ticket received from the second POS device are concurrent versions.

A version vector is a mechanism for tracking changes to data in a distributed system, where multiple agents might update the data at different times. The version vector allows the devices to determine if one update preceded another (happened-before), followed it, or if the two updates happened concurrently (and therefore might conflict with each other). In this way, version vectors enable tracking among data replicas (i.e. versions of open tickets).

In the update rules for version vectors discussed herein; replica open tickets can either experience local updates (e.g., the merchant device adding an item to the local version of the open ticket on the merchant device) or can synchronize with another replica open ticket.

In operation, the device creating the open ticket also creates a version vector which initially includes one or more counters set to zero. Each counter corresponds to a device operating within the system, and, in some implementations, the vector also includes a label for each counter to identify the corresponding device. In some implementation, the version vector includes a counter for all devices in the system at initiation. In other implementations, the version vector includes a counter for those devices that have had interactions that included the open ticket associated with the vector.

In operation, each time a replica open ticket experiences a local update event, the device performing the local update increments the counter of the local vector corresponding to the device by one. In other words, each time a merchant updates the local version of the local ticket stored on the merchant device, the counter for the device within the version vector is incremented on the local device.

Each time two devices synchronize open tickets, the synchronizing devices both set the counters in the local version vectors to the maximum of the counter across both vectors. After synchronization, the two open tickets have identical version vectors.

Pairs of replica open tickets can be compared by inspecting their version vectors and may be determined to be either: identical, concurrent, or ordered. In the case that one or both of the vectors contain counters associated with device(s) not included in the other vector, the vector missing the counter is assumed to include the counter with a value of zero (i.e. the device associated with that counter has made zero changes to the history of the version of the open ticket having the zero counter or missing counter).

The ordered relation is one in which a first vector is an ancestor of a second vector. Such an ancestor/descendent relation exists if and only if every counter of the first vector is less than or equal to the corresponding counter in the second vector and at least one of the counters is strictly less than the corresponding counter in the second vector. If neither vector is an ancestor of the other, but the vectors are not identical, then the two vectors must be concurrent (from divergent branches). In the case that the open tickets being synchronized are concurrent versions, the system may reconcile the differences automatically or flag the open ticket for manual intervention.

As will be discussed in more detail with regard to FIGS. 2A-5, the merchant devices 108 and/or the payment service of the computing devices 112 may implement such synchronization functionality depending on the networking structure. As would be understood by one of ordinary skill in the art, the above discussed synchronization method is merely examples and implementations are not so limited. Many other synchronization mechanisms such as Lamport clocks would be apparent to one of ordinary skill in the art in view of this disclosure.

As mentioned above, the operations of modules 122-124, 136-138 and 146-150 may vary depending on functionality provided by the particular implementation. As such, the implementations are not limited to the example provided above. Additional details and example functionalities of the user device(s) 104, merchant device(s) 108 and the computing devices 112 as a whole are discussed below with regard to FIGS. 2A-5.

Figure 2A:
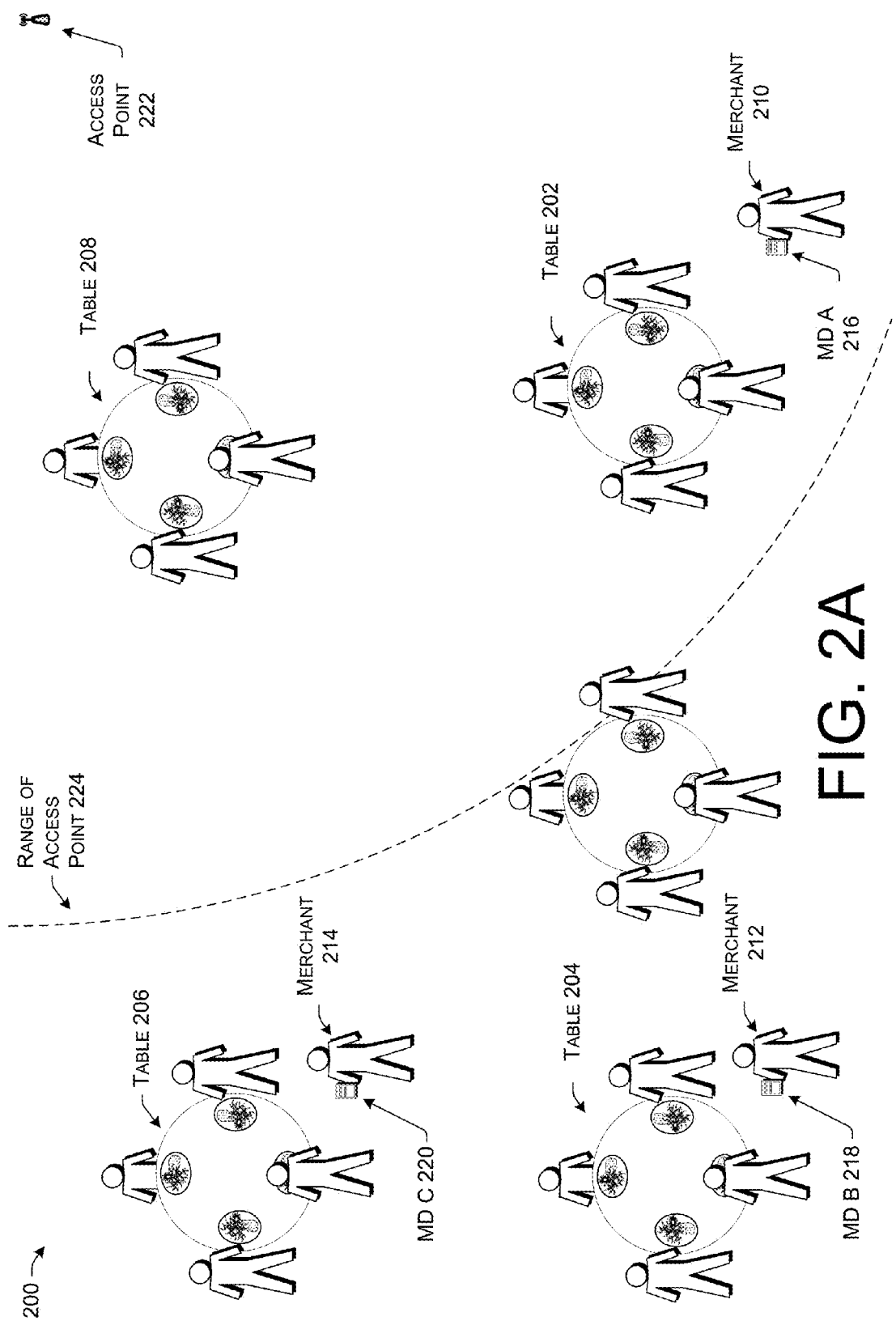

FIGS. 2A-2B are example illustrations that provides context for the discussion of various scenarios with respect to FIGS. 3A-4C. In particular, FIGS. 2A and 2B are an illustration of two scenarios 200 and 250 occurring at a restaurant in which open ticket transactions including offline mode operations. In general, the scenario is as follows.

Four groups of customers are seated at the restaurant at respective tables 202-208. Merchants 210-214 are waiting on the customers of the tables 202-208. Each of the merchants 210-214 has a respective merchant device, MD A 216, MD B 218 and MD C 220. The merchant devices receive input from the merchants regarding open ticket transactions. For example, the merchant 210 may create an open ticket for items requested by the customers 202 using the merchant device A 216. The merchant devices 216-220 operate to connect to the access point 222 when the devices are within the range of the access point 224. While connected, the merchant devices 216-220 may communicate with each other through a LAN network provided by the access point 222 and/or a payment service (not shown) such as that provided by computing devices 112. While outside of the range of the access point 224, the merchant devices 216-220 operate in an off-line mode. While in the off-line mode, the off-line merchant device may not be able to synchronize open ticket transaction data with the other merchant devices and/or the payment service. As such, changes to the local version of the open ticket may cause the open ticket to branch or diverge from the version of the open ticket maintained by the other merchant devices and/or the payment service.

As stated previously, in some implementations, the merchant devices may operate together and/or with a payment service to implement the off-line mode functionality such that a plurality of merchant devices may alter respective local versions of the same open ticket and then synchronize the altered local version such that differences are reconciled.

In the particular example illustrated in FIG. 2A, the merchant device A 216 is operating in an online mode while merchant device B 218 and merchant device C 220 are in an off-line mode. As such, in implementations in which a payment service operates to synchronize differences between local versions of open tickets stored by the merchant devices, the open ticket transaction data on merchant device A 216 may be synchronized with the payment service as changes occur. On the other hand, changes to open tickets occurring at merchant device B 218 and merchant device C 212 may not be synchronized because they are outside the range of the access point 224. When an offline device, such as merchant device B 218 or merchant device C 212, enters the range of the access point 224 and reconnects to the access point 222, changes to the local versions stored thereon may be synchronized with the payment service.

The following example scenario illustrates a divergence in open ticket transaction data that may need to be reconciled by the system. At the start of the scenario, the merchant 214 creates an open ticket for the customers at table 206 using the merchant device C 220. The open ticket transaction data is then synchronized with the payment service after the merchant device C entered the range of the access point 224. Through the payment service, the open ticket data for table 206 is synchronized to the merchant device B 218 while merchant device B is within range of the access point 224. Subsequently, the merchant 214 returns to the table 206 to take the customers' order. Because the merchant device C 220 is outside the range of the access point 224, the modifications to the local version of the open ticket associated with table 206 by the merchant device C 220 may not be synchronized with the payment service. Next, at some point prior to the merchant device C 220 reentering the range of the access point 224, the merchant device B 218 exits the range of the access point 224 and goes into the offline mode. At this point, the merchant device B 218 has a local version of the open ticket for table 206 that does not include the changes made at merchant device C 220.

After the merchant 214 has left table 206, a customer at the table 206 asks merchant 212 to add one or more items to the open ticket for table 206. The merchant 212 adds the item to the local version of the open tickets stored at merchant device B 218. As such, two divergent local versions exist in the system, one with the items added by merchant 214 and the other including the items added by merchant 212. When the merchant device B 218 subsequently reenters online mode, the payment service may synchronize the payment service's local version of the open ticket with the local version stored in merchant device B 218. Similarly, when the merchant device C 220 reenters the online mode, the payment service may synchronize the payment service's local version of the open ticket with the local version stored on merchant device C 220 such that the version stored at the payment service includes all of the items requested by the customers.

Although discussed in the context of wait staff of a restaurant, the system of FIG. 2A is not so limited and may be extended or apply to other scenarios. For example, an extended scenario of FIG. 2A may include additional staff that deliver items to customers (e.g. pizza delivery or other item delivery). In such a scenario, the customer may call the restaurant and place an order. An open ticket may be created and distributed among devices of the merchant by the payment service via a Wi-Fi network operating at the restaurant. In this way, the merchant device of the delivery person may be provided with a copy of the open ticket. Once the items are ready for delivery, the delivery person may leave the restaurant to make the delivery. While en route, the merchant device of the delivery person may enter an offline mode. However, using the system described above, either the delivery person or the restaurant may make changes to the open ticket. For example, the customer may contact the restaurant to add an item (e.g. a beverage) to the order. The restaurant may make this change to the open ticket. The merchant may understand that the open ticket of the delivery person will not be updated in offline mode. Assuming the delivery person is carrying the additional item anyway, the merchant may not take further action because the delivery person will be able to provide the beverage upon arrival. When the delivery person arrives and the customer requests the beverage, the delivery person may update the local version of the open ticket and provide the additional item. When the delivery person returns to the restaurant, the different versions of the open ticket may be reconciled using the techniques disclosed herein.

FIG. 2B includes a similar illustration of another example scenario 250 according to this disclosure. In particular, FIG. 2B illustrates a scenario at the a restaurant that differs from scenario 200 in that an additional merchant 252 is included who has a wide area network (WAN) enabled merchant device D 254. In addition, each of the merchant devices 216-220 and 254 is operating in an ad hoc networking mode. As shown, shown, each merchant device has an ad hoc range associated there with. In particular, merchant device A 216 is associated with ad hoc range A 256, merchant device B 218 is associated with ad hoc range B 258, merchant device C 220 is associated with ad hoc range C 260 and merchant device D 254 is associated with ad hoc range D 262. Rather than or in addition to synchronizing through a payment service as described with regard to FIG. 2A, the merchant devices 216-220 and 254 synchronize using peer-to-peer networking. Further, in some implementations, rather than or in addition to communicating with the payment service through the access point 222, the merchant devices 216-220 may communicate with the payment service through a shared Internet connection provided by the merchant device D 254. In other implementations, the merchant device D 254 may be the only merchant device that communicates directly with the payment service and the payment service may not include synchronization functionality for the off-line mode operations; e.g., all synchronization functionality is handled within the context of the peer-to-peer network by merchant devices 216-220 and 254. In still other implementations, the merchant devices 216-220 may communicate through a shared Internet connection provided by the merchant device D 254 and through the access point 222. An example of the operation of the devices of FIG. 2B is provided by FIGS. 4A-4C.

The scenarios provided above are merely examples and the scope of this disclosure is not limited to such scenarios. For example, the devices in the scenario 200 may communicate using a peer to peer networking scheme through the LAN provided by the access point 222. Also, the scenario 250 may also include an access point 222 and the communication mechanisms described with regard to scenarios 200 and 250 may be combined.

In a particular example of such a scenario, the system illustrated in FIG. 2B may be utilized in, for example, a pop-up or farmer's market restaurant. In an example of such a utilization, a manager or owner operator may have a mobile device with Wi-Fi and cellular connectivity (e.g. similar to merchant device D 254). At the same time, the merchant devices 216-220 may be devices operated by one or more waiters or staff. The manager or owner operator may have his employees bring their own devices for work. In such a scenario, the employees may desire to leave cellular data turned off to save money on their personal phone bills. In such a case, the devices the waiters brought from home may obtain internet access through the device of the manager or owner operator. Alternative, the manager or owner operator may provide Wi-Fi-only devices for his employees to operate. In either case, as discussed above regarding FIG. 2B, each time a waiter device enters WiFi range of the manager or owner operator device, the waiter device may synchronize with the server. Alternatively, the manager or owner operator device may synchronize with the waiter device then synchronize with the server.

Many other variations and examples based on the scenarios shown in FIGS. 2A and 2B would be apparent to one of skill in the art in view of this disclosure. In view of this general description of the scenario illustrated in FIGS. 2A-2B, various techniques for performing the associated tasks for open ticket payment handling with an offline mode will be discussed with regard to FIGS. 3A-4C.

The example processes are described in the context of the environment of FIG. 1 but are not limited to those environments. Each process described in this disclosure is illustrated as a logical flow graph, each operation of which represents a sequence of operations that can be implemented in hardware, software, or a combination thereof. In the context of software, the operations represent computer-executable instructions stored on one or more computer-readable media or embodied as one or more computer transmission media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In some implementations, the computer transmission media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Figure 3A:
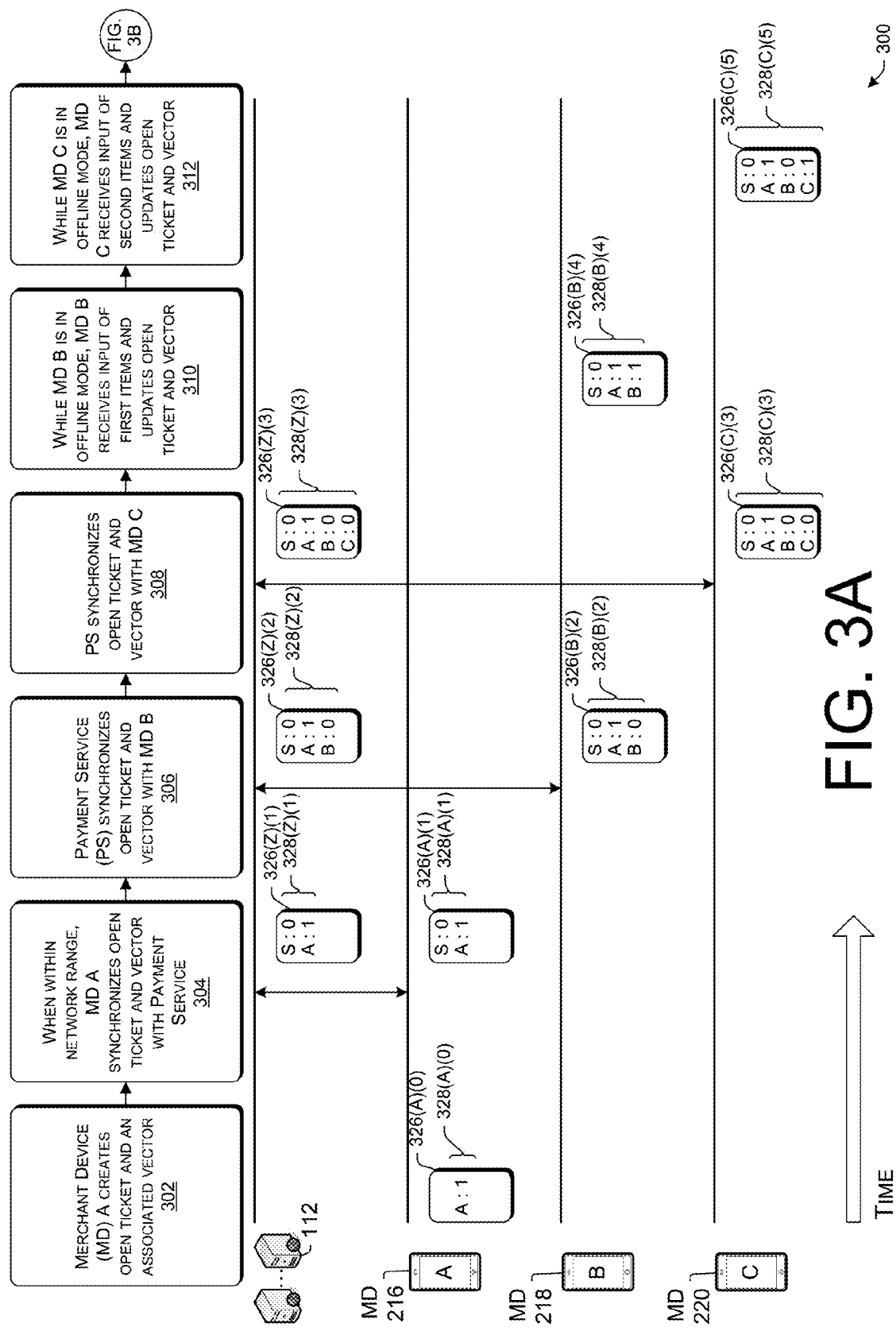
FIGS. 3A-3B are sequence diagrams illustrating the operations of the offline mode functionality executed by the system shown in FIG. 1 in the context of FIG. 2A.
Figure 3B:
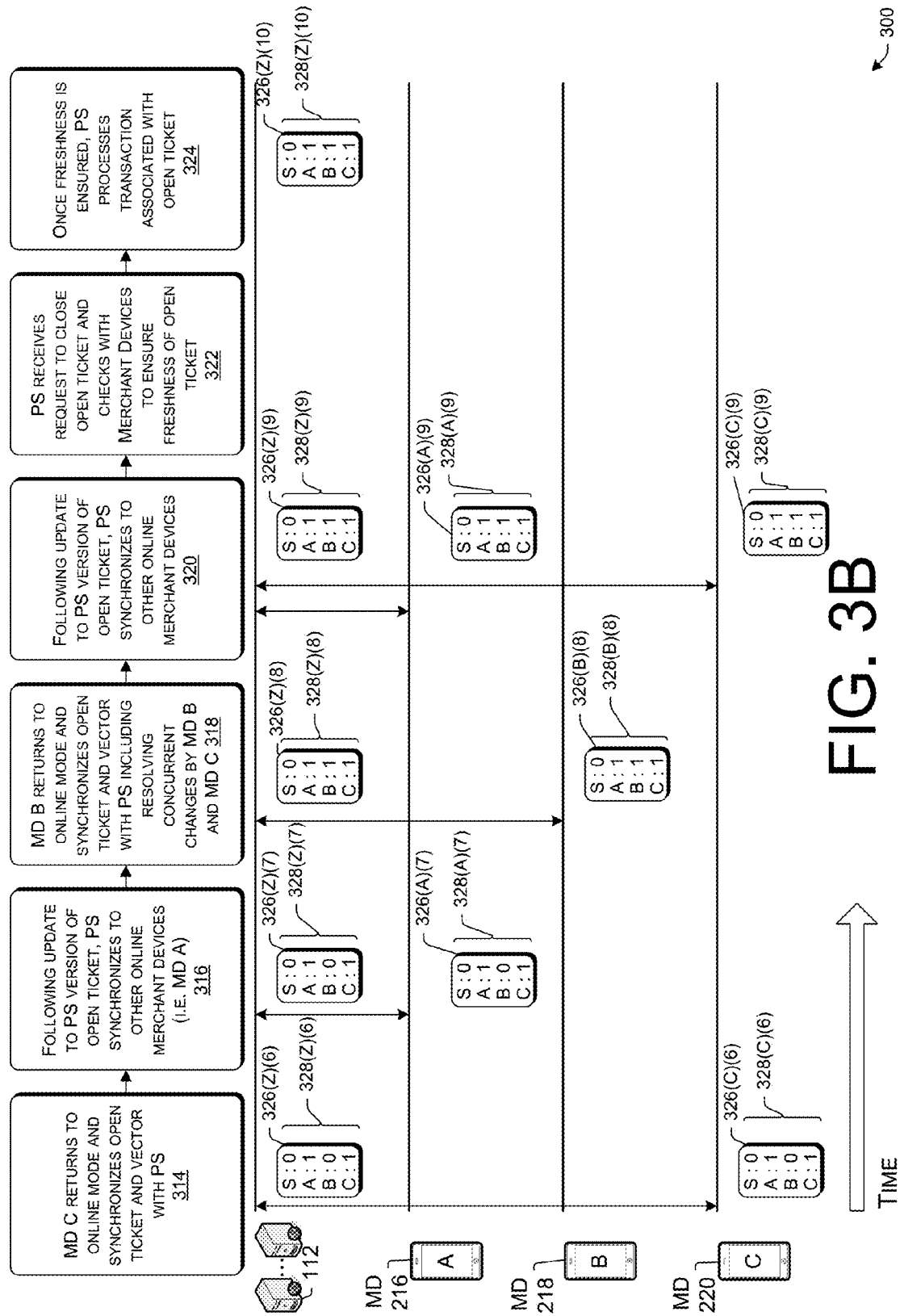

FIGS. 3A-3B collectively illustrate a sequence diagram 300 illustrating an example open ticket transaction in a point-of-sale (POS) context that is executed by a payment service and a plurality of merchant devices which have offline mode functionality. The process of FIGS. 3A-3B is discussed in the context of the FIG. 2A described above. Also, the process shown in FIG. 3A-3B utilizes a versioning data structure including version vectors to handle synchronization among the various devices shown in FIG. 3A-3B. However, these details are merely to aid in comprehension and the process may be utilized in many other contexts and may utilize other synchronization mechanisms.

At 302, the merchant inputs a request to merchant device A 216 to create an open ticket 326(A)(0) for the customers of a table. For example, the merchant may tap an "open ticket" button displayed by a UI to instruct the merchant device A 216 to create an open ticket 326(A)(0). In response, the merchant device A 216 may create a data record to maintain information 328(A)(0) regarding the open ticket. In addition, the merchant device A 216 may create a data record for a vector 328(A)(0) associated with the open ticket 326(A)(0) or may include the vector 328(A)(0) in the data record of the open ticket 326(A)(0). As shown in the example of FIG. 3A, once the open ticket 326(A)(0) and vector 328(A)(0) have been created, the vector 328(A)(0) includes one entry, "A: 1". In some implementations, the merchant device A 216 creates the vector 328(A)(0) with one entry, "A: 0" and then updates the entry to "A: 1" to represent that the merchant device A 216 has made one change to the open ticket 326(A)(0). In this case, the one change is the creation of the ticket 326(A)(0) and/or the taking of initial item requests.

At 304, when the merchant device A 216 is within the network range and therefore able operate in an online mode, the merchant device synchronizes the open ticket 326(A)(0) and the vector 328(A)(0) for the open ticket transaction with the payment service operated by the computing devices 112. In this synchronization operation, because the payment service does not have a copy of the open ticket being synchronized, the payment service may be considered to have a vector including the entry "S: 0; A: 0". Because this is an ancestor of the vector "S: 0; A: 1" 328(A)(1) that the merchant device A 216 is considered to include under the version vector rules discussed above, the open ticket 326(A)(1) stored by the merchant device A 216 is copied to the payment service (328(Z)(1)) and both adopt the vector "S: 0; A: 1".

At 306, the payment service synchronizes the open ticket and vector with the merchant device B 218. This synchronization is performed in a similar manner to that described 304 and results in each storing the vector "S: 0; A: 1; B: 0" 328(Z)(2), 328(B)(2). Similarly, at 308, the payment service synchronizes the open ticket and vector with the merchant device C 220. This synchronization is also performed in a similar manner to that described 304 and results in each storing the vector "S: 0; A: 1; B: 0; C: 0" 328(Z)(3), 328(C)(3). In practical terms, the operations at 306 and 308 may represent sequential synchronizations performed with devices that are in online mode with the payment service following the synchronization performed at 304.

At 310, the merchant device B 218 enters off-line mode, for example, by leaving the range of the access point 224. Subsequently, while in the off-line mode, the merchant device B 218 receives input of one or more first items requested by the customers associated with the open ticket. In response, the merchant device B 218 updates its local version of the open ticket 326(B)(4) to include the first items and increments the counter of the vector associated with device B by one. As a result, the vector stored at merchant device B 218 is updated to "S: 0; A: 1; B: 1" 328(B)(4).

At 312, the merchant device C 220 enters off-line mode, for example, by leaving the range of the access point 224. In the illustrated example of FIG. 3A, the merchant device C 220 enters the off-line mode prior to the merchant device B 218 reentering online mode. While in the off-line mode, the merchant device C 220 receives input of one or more second items requested by the customers associated with the open ticket. In response, the merchant device C 220 updates in its own local version of the open ticket 326(C)(5) to include the second items and increments the counter of the vector associated with device C by one. As a result, the vector 328(C)(5) stored at merchant device C 220 is updated to "S: 0; A: 1; B: 0, C: 1". This mirrors the example provided above with regard to FIG. 2A in which a customer associated with the open ticket asks a second waiter for additional items after the first waiter has already taken a request for items and walked away. At this point, two divergent versions of the open ticket exist, one 326(B)(4) stored by merchant device B 218 and one 326(C)(5) stored by merchant device C 220. The process then continues in FIG. 3B.

At 314, the merchant device C 220 is illustrated as having returned to online mode, for example, by entering the range of the access point 224. In the illustrated example of FIG.

3B, upon entering the online mode, the merchant device C initiates a synchronization with the payment service. As a result of synchronizing the open ticket and vector with the payment service, the open ticket 326(Z)(3) stored by the payment service is determined to be an ancestor of the open ticket 326(Z)(5) stored by the merchant device C 220 and the payment service 112 could be considered to adopt the open ticket at 326(Z)(6) of 326(C)(6) and the vector at 328(Z)(6) of 328(C)(6) of the merchant device C 220.

At 316, the payment service determines that the open ticket has been updated. As such, the payment service initiates synchronization of open ticket at 326(Z)(7) and vector 328(Z)(7) with the other merchant devices that are online. In this case, merchant device A 216 is online and the synchronization to open ticket 326(A)(7) and 328(A)(7) is performed.

At 318, the merchant device B 218 is illustrated as having returned to online mode, for example, by entering the range of the access point 224. In the illustrated example of FIG. 3B, upon entering the online mode, the merchant device B 218 initiates a synchronization with the payment service 112. At this point in the process, the merchant device B 218 includes the vector "S: 0; A: 1; B: 1" 328(B)(4) and the payment service includes the vector "S: 0; A: 1; B: 0, C: 1" 328(Z)(7), because, under the previously discussed update rules of version vectors, neither vector is an ancestor of the other and the vectors are not identical, the synchronization process determines the open tickets associated with the vectors to be concurrent versions. Depending on the implementation, the synchronization process may resolve the differences in the concurrent versions of the open ticket using an automated process and/or by flagging the open ticket for manual review. For example, if the second items included in the version of the open ticket stored by the payment service are distinct from the first items included in the version of the open ticket stored by the merchant device B 218, the synchronization process may automatically add the first items to the version stored by the payment service and add the second items to the version stored by merchant device B. For example, if the first items were a coke and fries and the second items were a beer and hamburger, no risk of duplication is apparent and such an automatic process may be used. In other scenarios, manual intervention may be requested. For example, if the first items were a beer and fries and the second items were also a beer and fries that are distinct based on the time and device at which the second items were entered, there is a risk that the second items are a duplicate request by the customers for the first items. Such a situation may occur if the customer believes that the first request was forgotten and makes a second request to another waiter based on that belief. Where the risk of duplication exists, the synchronization process may flag the open ticket for manual review by, for example, one or more of the waiters associated with merchant devices B 218 and C 220. For example, the synchronization process may cause the merchant device B 218 to display a user interface requesting the waiter associated with the device determine if the items are duplicates or represent requests for distinct items. As previously stated, the vectors are both updated to include the maximum value of the counters of the two vectors. As such, the merchant device B and payment service each include the vector "S: 0; A: 1; B: 1, C: 1" 328(B)(8), 328(Z)(8).

At 320, following the update of the payment service version of the open ticket, the payment service initiates a synchronization with the other online merchant devices (i.e. merchant device A and merchant device C). As both these synchronizations are of ancestor and descendent versions of the open ticket 326(Z)(9) and vector 328(Z)(9), the synchronizations may be performed in a manner similar to the operations at 304. As such, the merchant device A and merchant device C each store the version of the open ticket 326(A)(9), 326(C)(9) stored by the payment service and include the vector "S: 0; A: 1; B: 1, C: 1" 328(A)(9), 328(C)(9).

At 322, the payment service receives a request to close the open ticket, for example, from one of the merchant devices. In response, the payment service checks with the merchant devices to determine if the version of the open ticket stored by the payment service is fresh. Depending on the implementation, the payment service may check with those devices that have been involved in the history of the version vector stored by the payment service or the payment service may check with all known devices. In the case that a merchant device is an off-line mode and the payment service is unable to check with the device for freshness, the payment service may wait for the device to enter online mode or request authorization from the merchant device initiating the close ticket request.

At 324, once freshness is ensured or authorization is received to proceed, the payment service processes the transaction associated with the open ticket 326(Z)(10) and vector 328(Z)(10). For example, the computing devices 112 of the payment service may interact with the card payment network computing devices 158 and/or bank computing devices 158 to complete the financial transaction.

The sequence of operations described above is only an example provided for discussion purposes. Numerous variations are possible. Additional example variations are provided below in the discussion of FIGS. 4A-4C and FIG. 5.

Figure 4B:
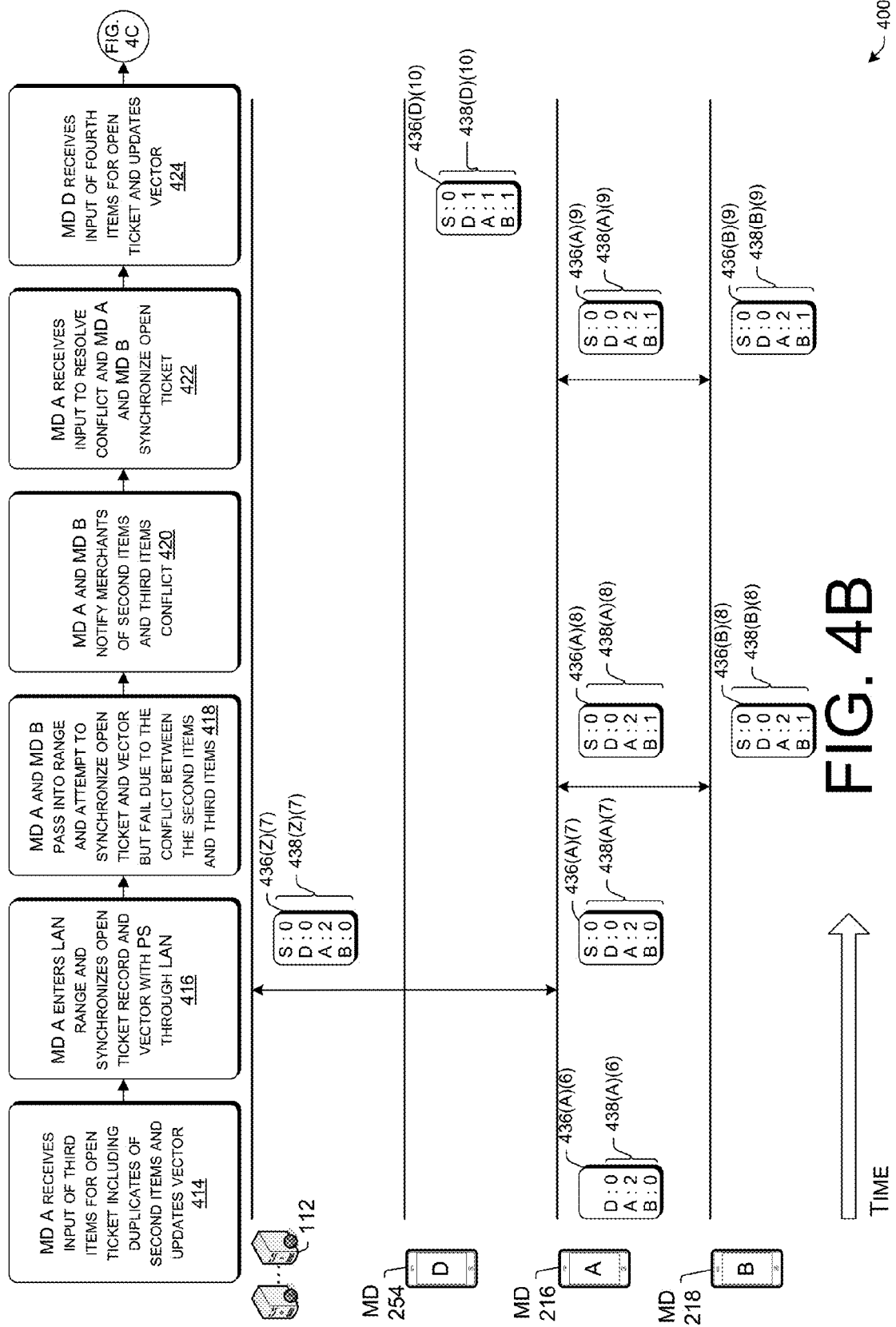

FIGS. 4A-4C collectively illustrate a sequence diagram 400 illustrating an example open ticket transaction in a point-of-sale (POS) context that is executed by a payment service and a plurality of merchant devices which have offline mode functionality. The process of FIGS. 4A-4C differs from that of FIGS. 3A-3B in that the merchant devices also perform peer-to-peer synchronization as previously discussed in the context of the FIG. 2B. In particular, FIGS. 4A-4C illustrate interaction between the payment service of the computing devices 112, the merchant device A 216, the merchant device B 218 and the WAN enabled merchant device D 254. In the particular example illustrated in FIGS. 4A-4C, the merchant devices A 216 and B 218 may communicate with the payment service via a LAN connection provided by the access point 222 or through a shared WAN connection provided by merchant device D 254. As with FIGS. 3A-3B, the process shown in FIG. 4A-4C utilizes a versioning data structure including version vectors to handle synchronization among the various devices shown in FIG. 4A-4C. However, these details are merely to aid in comprehension and the process may be utilized in many other contexts and may utilize other synchronization mechanisms.

At 402, the merchant inputs a request to merchant device A 216 to create an open ticket 436(A)(0) for the customers of a table and enters one or more first items requested by the customers. For example, the merchant may tap an "open ticket" button displayed by a UI to instruct the merchant device A 216 to create an open ticket. Further, the merchant may utilize a UI to enter the one or more first items. In response, the merchant device A 216 may create a data record to maintain information regarding the open ticket and add the one or more first items to the data record. In addition, the merchant device A 216 may create a data record for a vector 438(A)(0) associated with the open ticket 436(A)(0)

or may include the vector 438(A)(0) in the data record of the open ticket 436(A)(0). As shown in the example of FIG. 4A, once the open ticket 436(A)(0) and vector 438(A)(0) have been created the vector includes one entry, "A: 1". In some implementations, the merchant device A 216 creates the vector with one entry, "A: 0" and then updates the entry to "A: 1" to represent that the merchant device A 216 has made one change to the open ticket. In this case, the one change is the creation of the ticket and the adding of the first item to the open ticket. However, implementations are not so limited. In other implementations, these operations may be considered to be separate and the counter for device A may instead be incremented twice. In at least one example, a point-of-sale (POS) device A of a merchant receives a first input of a first customer order associated with a transaction between the merchant and one or more customers, the POS device A can be configured with a cellular data connection and a WiFi connection. The POS device A can store the first customer order as an open ticket 436(A)(0) with an associated versioning data structure 438(A)(0) in a memory of the POS device A.

At 404, the merchant device A 216 and the merchant device B 218 pass into ad hoc networking range. Upon detecting the ad hoc connection, the devices initiate a synchronization of the open ticket data stored by the merchant devices A, B Because the devices determine that the merchant device B does not include the open ticket, the merchant devices synchronize the open ticket and the vector for the open ticket transaction. In this synchronization operation, because the merchant device B 218 does not have a copy of the open ticket being synchronized, the merchant device B 218 may be considered to have a vector including the entry "A: 0; B: 0". Because this is an ancestor of the vector "A: 1; B: 0" that the merchant device A 216 is considered to include under the version vector rules discussed above, the open ticket 436(A)(1) stored by the merchant device A 216 is copied to the merchant device B 218 as open ticket 436(B)(1) and both adopt the vector "A: 1; B: 0" 438(A)(1), 438(B)(1). In at least one example, a POS device B of the merchant is configured without a cellular data connection and with a WiFi connection, and, based at least in part on the POS device A and the POS device B being in an online mode, the POS device B can receive from the POS device A a copy 436(B)(1) of the open ticket 436(A)(1) and a copy 438(B)(1) of the associated versioning data structure 438(A)(1).

At 406, the merchant device A 216 and the merchant device D 254 pass into ad hoc networking range. Upon detecting the ad hoc connection, the devices initiate a synchronization of the open ticket data stored by merchant devices A 216 and D 254. This synchronization process may be performed in a similar manner to that discussed above with regard to the operations at 404. As a result, the merchant devices A and D each store the version of the open ticket as open ticket 436(A)(2) and 436(D)(2) previously stored by the merchant device A and include the vector "D: 0; A: 1; B: 0" 438(A)(2), 438(D)(2).

At 408, the merchant device D 254 enters WAN service range. Upon detecting the connection to the payment service of the computing devices 112 via the WAN connection, the merchant device D 254 initiates synchronization of the open ticket and vector with the payment service. This synchronization process may be performed in a similar manner to that discussed above with regard to the operations at 404. As a result, the merchant devices D and the payment service each store the version of the open ticket as open ticket 436(D)(3) and 436(Z)(3) previously stored by the merchant device D and include the vector "S: 0; D: 0; A: 1; B: 0" 438(D)(3), 438(Z)(3).

At 410, the merchant device B 218 passes out of the range of the other merchant devices and the access point, entering an off-line mode. Subsequently, while in the off-line mode, the merchant device B 218 receives input of one or more second items requested by the customers associated with the open ticket. In response, the merchant device B 218 updates its local version of the open ticket to include the second items and increments the counter of the vector associated with device B by one. As a result, the vector 438(B)(4) stored at merchant device B 218 is updated to "A: 1; B: 1". In at least one example, the POS device B receives a second input of a second customer order associated with the transaction while the POS device A and the POS device B are in an offline mode with respect to one another in which the POS device A and the POS device B are out of WiFi range. In at least one example, the POS device B can update the copy of the open ticket and associated versioning data structure based on the second input while the POS device A and POS device B are in the offline mode with respect to one another.

At 412, the merchant device B 218 and the merchant device D 254 pass into ad hoc networking range. Upon detecting the ad hoc connection, the devices initiate a synchronization of the open ticket data stored by merchant devices B 218 and D 254. This synchronization process may be performed in a similar manner to that discussed above with regard to the operations at 404. As a result, the merchant devices B and D each store the version of the open ticket previously stored by the merchant device B and include the vector "S: 0; D: 0; A: 1; B: 1" 438(B)(5), 438(D)(5). The process then continues to FIG. 4B.

At 414, the merchant device A 216 passes out of the range of the other merchant devices and the access point, entering an off-line mode. While in the off-line mode, the merchant device A 216 receives input of one or more third items requested by the customers associated with the open ticket which includes one or more duplicates of the second items. In at least one example, the POS device A receives a third input of a third customer order associated the one or more customers prior to the POS device A and POS device B reconnecting. In response, the merchant device A 216 updates its local version of the open ticket to include the third items and increments the counter of the vector associated with device A by one. As a result, the vector 438(A)(6) stored at merchant device A 216 is updated to "D: 0; A: 2; B: 0". In at least one example, the POS device A updates the open ticket 438(A)(6) with the associated versioning data structure, e.g., 438(A)(6), in the memory of the POS device A based on the third input.

At 416, the merchant device A 216 is illustrated as having entered the range of the access point 224 thereby entering an online mode and gaining connection to the payment service. In the illustrated example of FIG. 4B, upon entering the online mode with the payment service, the merchant device A initiates a synchronization with the payment service Z through the LAN connection with the access point 222. As a result of synchronizing the open ticket and vector with the payment service Z, the open ticket stored by the payment service is determined to be an ancestor of the open ticket stored by the merchant device A 216 and the payment service Z could be considered to adopt the open ticket of the merchant device A 216 and each updates its vector to "S: 0; D: 0; A: 2; B: 0" 438(Z)(7), 438(A)(7) of respective open tickets 436(Z)(7), 436(A)(7).

At 418, the merchant device A 216 and the merchant device B 218 pass into ad hoc networking range. Upon detecting the ad hoc connection, the devices initiate a synchronization of the open ticket data stored by the merchant devices. However, the attempted synchronization of the open ticket and vector may fail due to the conflict between the second items and third items which were previously stated to include duplicates of the second items. In at least one example, the POS device B 218 receives from the second POS device A 216 the updated copy of the open ticket 436(B)(8), 436(A)(8) and the updated copy of the associated versioning data structure 438(B)(8), 438(A)(8) when the POS device B and POS device A are in an online mode with respect to one another in which the POS device B and the POS device A are back in WiFi range and have reconnected. In some examples, it is determined that the open ticket 436(A)(7) in the memory of the POS device A is an ancestor of the updated copy of the open ticket received from the POS device B 436(B)(5) based on the associated versioning data structure 438(A)(7) in the memory of the POS device A and the updated copy of the associated versioning data structure 438(B)(5) received from the POS device B, and the reconciling is based at least on the determination that the open ticket 436(A)(7) in the memory of the first POS device A is an ancestor of the updated copy of the open ticket 436(B)(5) received from the POS device B. At 420, because there is a risk of duplicate items, the merchant device A 216 and the merchant device B 218 notify the merchants of the duplicate item risk between the second items and the third items. The reconciling can comprise: determining one or more items of the third customer order match one or more of the items of the second customer order; requesting the merchant to provide fourth input regarding whether the one or more items of the third customer order are duplicate requests by the one or more customers for the one or more items of the second customer order; and generating the reconciled open ticket based on the fourth input received from the merchant. In some examples, the reconciling can comprise: determining one or more items of the third customer order do not match one or more items of the second customer order, and generating the reconciled open ticket such that the reconciled open ticket includes at least the one or more items of the second order and the one or more items of the third order that do not match. At 422, the merchant device A 216 receives input from the merchant to resolve the conflict. Based on the input, the merchant device A 216 and the merchant device B 218 synchronize their respective open tickets 436(A)(9), 436(B)(9) to include the items not indicated as being duplicates by the merchant input and update their vectors to "S: 0; D: 0; A: 2; B: 1" 438(A)(9), 438(B)(9). In at least one example, the POS device A reconciles the open ticket with the updated copy of the open ticket based on the associated versioning data structure and the updated copy of the associated versioning data structure to generate a reconciled open ticket. In at least one example, upon updating the open ticket with the associated versioning structure in the memory of the POS device A based on the third input, it is determined that the open ticket in the memory of the POS device A and the updated copy of the open ticket received from the POS device B are concurrent versions based on the associated versioning data structure in the memory of the POS device A and the updated copy of the associated versioning data structure received from the POS device B, and the reconciling is based at least the determination that the open ticket in the memory of the POS device A and the updated copy of the open ticket received from the POS device B are concurrent versions.

At 424, the merchant device D 254 passes out of the range of the other merchant devices, the access point and the WAN service, entering an off-line mode. Subsequently, while in the off-line mode, the merchant device D 254 receives input of one or more fourth items requested by the customers associated with the open ticket. In response, the merchant device D 254 updates its local version of the open ticket 436(D)(10) to include the fourth items and increments the counter of the vector associated with device D by one. As a result, the vector stored at merchant device D 254 is updated to "S: 0; D: 1; A: 1; B: 1" 438(D)(10). The process then continues to FIG. 4C.

At 426, the merchant device A 216 and the merchant device D 254 pass into ad hoc networking range. Upon detecting the ad hoc connection, the devices initiate a synchronization of the open ticket data stored by the merchant devices. As discussed above, the vectors stored by the merchant device A 216 and the merchant device D 254 are concurrent vectors. As such, the synchronization process may attempt an automatic reconciliation of the differences in the tickets or may request manual intervention. In this case, the fourth items are not duplicates of the third items and automatic reconciliation is possible. In addition, information about the previous manual intervention performed at 422 may be maintained by the version stored at merchant device A 216 to allow for automatic reconciliation in the future for the third items. Once the reconciliation is performed, the vectors of the open tickets 436(A)(11), 436(D)(11) on both devices are updated to "S: 0; D: 1; A: 2; B: 1" 438(A)(11), 438(D)(11).

At 428, merchant device D 254 enters WAN service and synchronizes the open ticket 436(D)(12) and 438(D)(12) vector with the open ticket 436(Z)(12) and vector 438(Z)(12) of the payment service. This synchronization is between an ancestor and descendent and therefore may be performed as discussed above. In at least one example, the payment service can receive from the POS device A (at least partly via the cellular data connection) the reconciled open ticket 436(A)(11).

At 430, the merchant device A 216 receives a request to close the open ticket. In response, the merchant device A 216 causes a check-in with the other merchant devices to ensure the freshness of the open ticket stored at merchant device A 216. At 432, because the merchant device A 216 did not receive responses to the freshness check-in requests from all the merchant devices, the merchant device A 216 prompts the merchant of merchant device A 216 for authorization to proceed without information from one or more of the other merchant devices. For example, merchant device B 218 may have passed out of the range of the other merchant devices, the access point and the WAN service, entering an off-line mode. As such, the check-in with device B will fail due to the lack of connection. As such, the merchant device A 216 may request authorization to proceed without check-in confirmation with device B. If granted, the process moves to 434. In at least one example, the payment service receives from the POS A device a request to process payment for a cost of the transaction between the merchant and the one or more customers, at least partly via the cellular data connection.

At 434, once freshness of the version stored at merchant device A is ensured or authorization is received to proceed without freshness responses from one or more other merchant devices, the merchant device A 216 sends a request to the payment to process the transaction associated with open ticket. The payment service may execute the transaction in the manner discussed above. In at least one example, the payment for the cost of the transaction between the merchant and the one or more customers is processed based on the reconciled open ticket.

The sequence of operations described above is only an example provided for discussion purposes. Numerous variations are possible.

Figure 5:
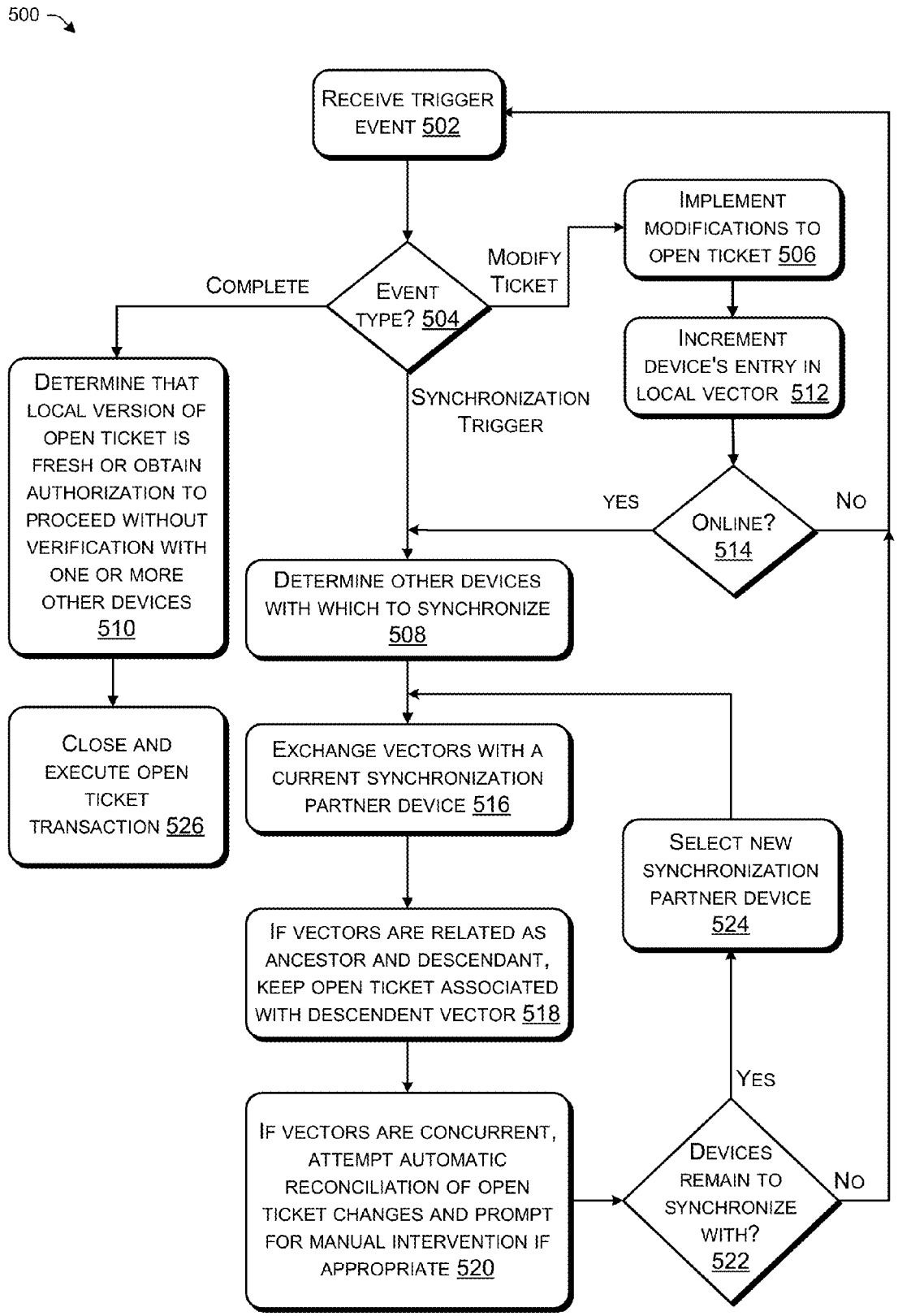
FIG. 5 is a flow diagram illustrating an example process for handling open ticket transactions including offline mode functionality in the system shown in FIG. 1 and as discuss with regard to FIGS. 2A-4C.

FIG. 5 is a flow diagram illustrating an example process 500 for handling open ticket transactions including the offline mode functionality disclosed herein. The following actions described with respect to FIG. 5 may be performed by the merchant device(s) 108 and/or the payment service of the computing devices 112 as shown in FIG. 1 and may be used in the context of FIGS. 2-4C.

At 502, the synchronization process receives a trigger event associated with an open ticket transaction. In the example illustrated in FIG. 5, three general types of trigger events are shown, a modify open ticket trigger, a synchronization trigger and a complete transaction trigger. At 504, the synchronization process determines the type of event. If the trigger event is a modify ticket trigger, the process continues to 506. If the trigger event is a synchronization trigger, the process continues to 508. If the trigger event is a complete transaction trigger, the process continues to 510.

At 506, the synchronization process implements the modification to the open ticket. In the restaurant example, the modify ticket request may include a request to add items to the ticket or a request to add payment instruments to the open ticket. The process then continues to 512.

At 512, the synchronization process increments the current device's counter in the local vector associated with the open ticket. This may performed in the manner discussed above with regard to FIGS. 1-4C. The process then continues to 514.

At 514, the synchronization process determines whether the current device is operating in an online mode (i.e. if the current device is connected to any other device that, in the particular implementation, the current device performs synchronizations with). If the current device is in an online mode, the process continues to 508. Otherwise, if the current device is in an off-line mode, the process returns to 502 and awaits a new trigger event.

Returning to 508, which may be reached from 504 in response a synchronization trigger or from 514 in response to a determination that the current device is in an online mode, the synchronization process determines the other devices with which to synchronize. Depending on the implementation, various events may be considered synchronization event triggers. Some examples include returning to online mode (e.g. by gaining a general network connection or a peer-to-peer connection), synchronization with another device that results in an update of the local vector while connected to other devices and a refresh timer which triggers synchronization on a regular basis. The determination of the devices to synchronize with may vary based on the role of the current device executing the synchronization process and the networking structure of the implementation. For example, the payment service in an implementation such as that shown in FIG. 2A attempts to synchronize with all online devices other than a device with whom a synchronization has changed the local vector stored by the payment service. On the other hand, the merchant devices in FIG. 2A may only synchronize with the payment service in some implementations. On the other hand, the merchant devices in the implementation illustrated in FIG. 2B may attempt to synchronize with both the payment service and any other merchant device which is in connection with the current device. After determining which other devices to synchronize with, the process then continues to 516.

At 516, the synchronization process exchanges vectors with a current synchronization partner device and determines the relationship between the open tickets based on the vectors. At 518, if the vectors are related as ancestor and descendent, the synchronization process may operate to cause both devices keep the descendent version of the open ticket. At 520, if the vectors are concurrent, the synchronization process may attempt an automatic reconciliation of the open ticket changes. If the automatic reconciliation is not successful or the synchronization process does not handle the type of conflict that is present, the synchronization process may prompt the merchant for manual intervention. Once the open tickets are synchronized, the process continues to 522.

At 522, the synchronization process determines if any devices remain with which to synchronize. If so, the process continues to 524. Otherwise, the process returns to 502.

At 524, the synchronization process determines a new synchronization partner and the process returns to 516 to synchronize with the new synchronization partner.

Returning to 510, which may be reached from 504 in response to a complete transaction trigger event, the synchronization process attempts to determine whether the local version of the open ticket is fresh (i.e. accounts for all changes throughout the system). In some implementations, the synchronization process of the current device may attempt to communicate with all devices in the system or those devices which are known to have "touched" the open ticket. In some scenarios, the synchronization process may be unable to check with all the other devices (e.g. the other device may be offline). In such a case, the synchronization process may prompt the merchant to obtain authorization to proceed without checking in with one or more of the other devices with which it cannot communicate. The process then continues to 526.

At 526, the synchronization process may cause the transaction to be closed and completed. For example, the payment service may be caused to communicate with the card payment network computing devices 158 and/or the bank computing devices 160 to process payments for the cost of the transaction from any payment instruments associated with the open ticket transaction.

The process 500 described above is only an example provided for discussion purposes. Numerous variations are possible.

As previously stated, each of the above discussed scenarios is merely an example and many variations are possible. Moreover, many variations of the techniques discussed above are possible as well without departing from the scope of this disclosure. For example, the techniques and systems disclosed herein may be utilized in contexts other than open ticket transactions. In a particular variation, the techniques and systems disclosed herein may be utilized in the context of inventory synchronization between merchant devices in a manner similar to that discussed above.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing instructions executable by one or more processors, wherein the instructions program the one or more processors to perform acts comprising:
   receiving, by a first point-of-sale (POS) device of a merchant, a first input of a first customer order associated with a transaction between the merchant and one or more customers, the first POS device configured with a cellular data connection and a second connection, wherein the second connection comprises at least one of a WiFi connection or a close-range wireless connection;
   storing the first customer order as an open ticket with an associated versioning data structure in a memory of the first POS device;
   distributing, by the first POS device to second POS device while in an online mode with respect to each other, a copy of the open ticket and a copy of the associated versioning data structure, wherein the online mode comprises a state in which the first POS device and the second POS device are capable of communicating via the second connection, and wherein the first POS device and the second POS device are among a set of merchant devices that are configured to communicate with each other in the online mode;
   receiving, by the second POS device, a second input of a second customer order associated with the transaction while the first POS device and the second POS device are in an offline mode with respect to one another, wherein the offline mode comprises a state in which the first POS device and the second POS device are unable to communicate via the second connection;
   updating, by the second POS device and based at least in part on the second input, the copy of the open ticket and the copy of the associated versioning data structure to generate an updated copy of the open ticket and an updated copy of the associated versioning data structure while the first POS device and the second POS device are in the offline mode;
   based at least in part on the first POS device transitioning from the offline mode to the online mode, automatically synchronizing the open ticket between the first POS device and the second POS device by:
      receiving, by the first POS device from the second POS device, the updated copy of the open ticket and the updated copy of the associated versioning data structure;
      reconciling, by the first POS device, the open ticket with the updated copy of the open ticket to generate a reconciled open ticket;
   sending, by the first POS device to a payment service via the cellular data connection, the reconciled open ticket and a request to process payment for a cost of the transaction between the merchant and the one or more customers, wherein the sending of the request to process the payment for the cost of the transaction causes the payment service to process the payment for the cost of the transaction between the merchant and the one or more customers based at least in part on the reconciled open ticket.

2. The one or more non-transitory computer-readable media as recited in claim 1, wherein the instructions program the one or more processors to further perform acts comprising:
   receiving, by the first POS device, a third input of a third customer order associated with the one or more customers prior to the first POS device and the second POS device transitioning from the offline mode to the online mode; and
   updating, by the first POS device, the open ticket with the associated versioning data structure in the memory of the first POS device based on the third input, and wherein the reconciling comprises:
      determining that one or more items of the third customer order match one or more items of the second customer order;
      requesting the merchant to provide fourth input regarding whether the one or more items of the third customer order are duplicate requests by the one or more customers for the one or more items of the second customer order; and
      generating the reconciled open ticket based on the fourth input received from the merchant.

3. The one or more non-transitory computer-readable media as recited in claim 1, wherein the instructions program the one or more processors to further perform acts comprising:
   receiving, by the first POS device, a third input of a third customer order associated with the one or more customers prior to the first POS device and the second POS device transitioning from the offline mode to the online mode; and
   updating, by the first POS device, the open ticket with the associated versioning data structure in the memory of the first POS device based on the third input, and wherein the reconciling comprises:
      determining that one or more items of the third customer order do not match one or more items of the second customer order; and
      generating the reconciled open ticket such that the reconciled open ticket includes at least the one or more items of the second order and the one or more items of the third order that do not match.

4. The one or more non-transitory computer-readable media as recited in claim 1, wherein the instructions program the one or more processors to further perform acts comprising:
   determining that the open ticket in the memory of the first POS device is an ancestor of the updated copy of the open ticket received from the second POS device based on the associated versioning data structure in the memory of the first POS device and the updated copy of the associated versioning data structure received from the second POS device; and
   wherein the reconciling is based on at least the determination that the open ticket in the memory of the first POS device is an ancestor of the updated copy of the open ticket received from the second POS device.

5. The one or more non-transitory computer-readable media as recited in claim 1, wherein the instructions program the one or more processors to further perform acts comprising:
   receiving, by the first POS device, a third input of a third customer order associated with the one or more customers prior to the first POS device and the second POS device transitioning from the offline mode to the online mode;
   updating, by the first POS device, the open ticket with the associated versioning data structure in the memory of the first POS device based on the third input;
   determining that the open ticket in the memory of the first POS device and the updated copy of the open ticket received from the second POS device are concurrent versions based on the associated versioning data structure in the memory of the first POS device and the updated copy of the associated versioning data structure received from the second POS device; and wherein the reconciling is based at least on the determination that the open ticket in the memory of the first POS device and the updated copy of the open ticket received from the second POS device are concurrent versions.

6. The one or more non-transitory computer-readable media as recited in claim 1, wherein the associated versioning data structure comprises at least an associated version vector.

7. A method for processing order requests obtained from a plurality of sources as a single order, the method comprising:
- receiving, by a first point-of-sale (POS) device of a merchant, a first input of a first customer order associated with a transaction between the merchant and one or more customers, the first POS device configured to communicate with a payment server and a set of other POS devices of other merchants;
- storing the first customer order as an open ticket with an associated versioning data structure in a memory of the first POS device;
- based at least in part on the first POS device and the set of other POS devices being in an online mode with respect to one another, distributing a copy of the open ticket to the set of merchants devices, including a second POS device;
- receiving, by the second POS device, from the first POS device, a copy of the open ticket and a copy of the associated versioning data structure, wherein the second POS device is configured with at least one of a WiFi connection or a close-range wireless connection, and wherein the online mode comprises a state in which the first POS device and the second POS device are capable of communicating via at least one of the WiFi or the close-range wireless connection;
- receiving, by the second POS device, a second input of a second customer order associated with the transaction while the first POS device and the second POS device are in an offline mode with respect to one another, wherein the offline mode comprises a state in which the first POS device and the second POS device are unable to communicate via the at least one of the WiFi connection or the close-range wireless connection;
- updating, by the second POS device and based at least in part on the second input, the copy of the open ticket and the copy of the associated versioning data structure to generate an updated copy of the open ticket and an updated copy of the associated versioning data structure while the first POS device and the second POS device are in the offline mode;
- based at least in part on the first POS device and the second POS device transitioning from the offline mode to the online mode, automatically synchronizing the open ticket between the first POS device and the second POS device by:
  - receiving, by the first POS device from the second POS device, the updated copy of the open ticket and the updated copy of the associated versioning data structure; and
  - reconciling, by the first POS device, the open ticket with the updated copy of the open ticket to generate a reconciled open ticket;
- sending, by the first POS device to a payment service via the cellular data connection, the reconciled open ticket; and
- sending, by the first POS device to the payment service via the cellular data connection, a request to process payment for a cost of the transaction between the merchant and the one or more customers, and
- wherein the sending of the request to process the payment for the cost of the transaction causes the payment service to process the payment for the cost of the transaction between the merchant and the one or more customers based at least in part on the reconciled open ticket.

8. The method of claim 7, further comprising:
- receiving, by the first POS device, a third input of a third customer order associated with the one or more customers prior to the first POS device and the second POS device transitioning from the offline mode to the online mode; and
- updating, by the first POS device, the open ticket with the associated versioning data structure in the memory of the first POS device based on the third input, and wherein the reconciling comprises:
  - determining that one or more items of the third customer order match one or more items of the second customer order;
  - requesting the merchant to provide fourth input regarding whether the one or more items of the third customer order are duplicate requests by the one or more customers for the one or more items of the second customer order; and
  - generating the reconciled open ticket based on the fourth input received from the merchant.

9. The method of claim 7, further comprising:
- receiving, by the first POS device, a third input of a third customer order associated with the one or more customers prior to the first POS device and the second POS device transitioning from the offline mode to the online mode; and
- updating, by the first POS device, the open ticket with the associated versioning data structure in the memory of the first POS device based on the third input, and wherein the reconciling comprises:
  - determining that one or more items of the third customer order do not match one or more items of the second customer order; and
  - generating the reconciled open ticket such that the reconciled open ticket includes at least the one or more items of the second order and the one or more items of the third order that do not match.

10. The method of claim 7, further comprising:
- determining that the open ticket in the memory of the first POS device is an ancestor of the updated copy of the open ticket received from the second POS device based on the associated versioning data structure in the memory of the first POS device and the updated copy of the associated versioning data structure received from the second POS device; and
- wherein the reconciling is based on at least the determination that the open ticket in the memory of the first POS device is an ancestor of the updated copy of the open ticket received from the second POS device.

11. The method of claim 7, further comprising:
- receiving, by the first POS device, a third input of a third customer order associated with the one or more customers prior to the first POS device and the second POS device transitioning from the offline mode to the online mode;
updating, by the first POS device, the open ticket with the associated versioning data structure in the memory of the first POS device based on the third input
determining that the open ticket in the memory of the first POS device and the updated copy of the open ticket received from the second POS device are concurrent versions based on the associated versioning data structure in the memory of the first POS device and the updated copy of the associated versioning data structure received from the second POS device; and
wherein the reconciling is based at least on the determination that the open ticket in the memory of the first POS device and the updated copy of the open ticket received from the second POS device are concurrent versions.

12. The method of claim 7, wherein the associated versioning data structure comprises at least an associated version vector.

13. A system comprising:
a first point-of-sale (POS) device of a merchant, configured with a cellular data connection and a second connection, wherein the second connection comprises at least one of a WiFi connection or a close-range wireless connection, comprising:
one or more first processors;
one or more first non-transitory computer-readable media storing instructions executable by the one or more first processors, wherein the instructions, when executed by the one or more first processors, cause the one or more first processors to perform acts comprising:
receiving, by the first POS device of a merchant, a first input of a first customer order associated with a transaction between the merchant and one or more customers;
storing the first customer order as an open ticket with an associated versioning data structure;
transmitting to a second POS device a copy of the open ticket and a copy of the associated versioning data structure, wherein to transmit is based at least in part on the first POS device and the second POS device of the merchant being in an online mode with respect to one another, wherein the second POS device of a merchant is configured with at least one of a WiFi connection or a close-range wireless connection, and wherein the online mode comprises a state in which the first POS device and the second POS device are capable of communicating via the at least one of the WiFi connection or the close-range wireless connection;
the second POS device of the merchant comprising:
one or more second processors;
one or more second non-transitory computer-readable media storing instructions executable by the one or more second processors, wherein the instructions program the one or more second processors to perform acts comprising:
receiving a second input of a second customer order associated with the transaction while the first POS device and the second POS device are in an offline mode with respect to one another, wherein the offline mode comprises a state in which the first POS device and the second POS device are unable to communicate via the at least one of the WiFi connection or the close-range wireless connection;
updating, based at least in part on the second input, the copy of the open ticket and the copy of the associated versioning data structure to generate an updated copy of the open ticket and an updated copy of the associated versioning data structure while the first POS device and the second POS device are in the offline mode;
the acts of the first POS device further comprising:
based at least in part on the first POS device and the second POS device transitioning from the offline mode to the online mode, automatically synchronizing the open ticket between the first POS device and the second POS device by:
receiving, from the second POS device, the updated copy of the open ticket and the updated copy of the associated versioning data structure;
reconciling the open ticket with the updated copy of the open ticket to generate a reconciled open ticket;
sending, to a payment service via the cellular data connection, the reconciled open ticket; and
sending, to the payment service via the cellular data connection, a request to process payment for a cost of the transaction between the merchant and the one or more customers, and
wherein the sending of the request to process the payment for the cost of the transaction causes the payment service to process the payment for the cost of the transaction between the merchant and the one or more customers based at least in part on the reconciled open ticket.

14. The system of claim 13, the acts of the first POS device further comprising:
receiving a third input of a third customer order associated with the one or more customers prior to the first POS device and the second POS device transitioning from the offline mode to the online mode; and
updating the open ticket with the associated versioning data structure in the memory of the first POS device based on the third input, and wherein the reconciling comprises:
determining that one or more items of the third customer order match one or more items of the second customer order;
requesting the merchant to provide fourth input regarding whether the one or more items of the third customer order are duplicate requests by the one or more customers for the one or more items of the second customer order; and
generating the reconciled open ticket based on the fourth input received from the merchant.

15. The system of claim 13, the acts of the first POS device further comprising:
receiving a third input of a third customer order associated with the one or more customers prior to the first POS device and the second POS device transitioning from the offline mode to the online mode; and
updating the open ticket with the associated versioning data structure in the memory of the first POS device based on the third input, and wherein the reconciling comprises:
determining that one or more items of the third customer order do not match one or more items of the second customer order; and generating the reconciled open ticket such that the reconciled open ticket includes at least the one or more items of the second order and the one or more items of the third order that do not match.

16. The system of claim 13, the acts of the first POS device further comprising:

determining that the open ticket in the memory of the first POS device is an ancestor of the updated copy of the open ticket received from the second POS device based on the associated versioning data structure in the memory of the first POS device and the updated copy of the associated versioning data structure received from the second POS device; and wherein the reconciling is based on at least the determination that the open ticket in the memory of the first POS device is an ancestor of the updated copy of the open ticket received from the second POS device.

17. The system of claim 13, the acts of the first POS device further comprising:

receiving a third input of a third customer order associated with the one or more customers prior to the first POS device and the second POS device transitioning from the offline mode to the online mode;

updating the open ticket with the associated versioning data structure in the memory of the first POS device based on the third input;

determining that the open ticket in the memory of the first POS device and the updated copy of the open ticket received from the second POS device are concurrent versions based on the associated versioning data structure in the memory of the first POS device and the updated copy of the associated versioning data structure received from the second POS device; and wherein the reconciling is based at least on the determination that the open ticket in the memory of the first POS device and the updated copy of the open ticket received from the second POS device are concurrent versions.

18. The system of claim 13, wherein the associated versioning data structure comprises at least an associated version vector.

* * * * *

UNITED STATES PATENT AND TRADEMARK OFFICE
CERTIFICATE OF CORRECTION

PATENT NO. : 10,147,079 B2  
APPLICATION NO. : 14/686381  
DATED : December 4, 2018  
INVENTOR(S) : Christopher Philip Renke et al.

Page 1 of 1

It is certified that error appears in the above-identified patent and that said Letters Patent is hereby corrected as shown below:

In the Claims

Column 25, Line 17, change "to second" to -- to a second --

Column 25, Line 41, change "based at least in part on the first POS device transitioning" to -- based at least in part on the first POS device and the second POS device transitioning --

Column 25, Line 48, change "ture;" to -- ture; and --

Column 27, Line 30, change "merchants devices" to -- other POS devices --

Column 27, Line 39, change "WiFi" to -- WiFi connection --

Column 28, Line 2, change "the cellular" to -- a cellular --

Column 29, Line 6, change "input" to -- input; --

Column 29, Line 36, change "a merchant" to -- the merchant --

Column 29, Line 42, change "POS device a copy" to -- POS device of the merchant a copy --

Column 29, Line 46, change "device of the merchant being" to -- device being --

Column 29, Line 48, change "device of a merchant is" to -- device is --

Column 30, Line 19, change "structure;" to -- structure; and --

Signed and Sealed this  
Twenty-sixth Day of March, 2019

Andrei Iancu  
*Director of the United States Patent and Trademark Office*